US011858266B2

(12) United States Patent
Hori et al.

(10) Patent No.: US 11,858,266 B2
(45) Date of Patent: Jan. 2, 2024

(54) LIQUID EJECTING APPARATUS AND MAINTENANCE METHOD OF LIQUID EJECTING APPARATUS

(71) Applicant: SEIKO EPSON CORPORATION, Tokyo (JP)

(72) Inventors: Kazuhito Hori, Azumino (JP); Shinya Komatsu, Shiojiri (JP); Hitotoshi Kimura, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 2 days.

(21) Appl. No.: 17/444,425

(22) Filed: Aug. 4, 2021

(65) Prior Publication Data

US 2022/0040974 A1 Feb. 10, 2022

(30) Foreign Application Priority Data

Aug. 7, 2020 (JP) ................................ 2020-134456

(51) Int. Cl.
*B41J 2/045* (2006.01)
*B41J 2/18* (2006.01)
*B41J 2/19* (2006.01)

(52) U.S. Cl.
CPC ....... *B41J 2/04563* (2013.01); *B41J 2/04508* (2013.01); *B41J 2/04571* (2013.01); *B41J 2/04581* (2013.01); *B41J 2/18* (2013.01); *B41J 2/19* (2013.01)

(58) Field of Classification Search
CPC ....... B41J 2/175; B41J 2/19; B41J 2/18; B41J 2/04563; B41J 2/04581; B41J 2202/12; B41J 2/04571; B41J 2/04508; B41J 2/04528; B41J 2002/14354; B41J 29/38
See application file for complete search history.

(56) References Cited

U.S. PATENT DOCUMENTS

| | | | |
|---|---|---|---|
| 9,884,487 B2 | 2/2018 | Kobayashi et al. | |
| 10,029,483 B2 | 7/2018 | Kobayashi et al. | |
| 10,625,519 B2 | 4/2020 | Kobayashi et al. | |
| 11,077,677 B2 | 8/2021 | Kobayashi et al. | |
| 2009/0179937 A1* | 7/2009 | Yamada | B41J 2/04581 347/17 |
| 2013/0286120 A1 | 10/2013 | Kobayashi et al. | |
| 2014/0285587 A1 | 9/2014 | Kida et al. | |
| 2014/0285596 A1 | 9/2014 | Ando | |

(Continued)

FOREIGN PATENT DOCUMENTS

| | | |
|---|---|---|
| JP | S54-112632 | 9/1979 |
| JP | H01-154761 A | 6/1989 |

(Continued)

*Primary Examiner* — Jannelle M Lebron
(74) *Attorney, Agent, or Firm* — WORKMAN NYDEGGER

(57) ABSTRACT

A printer includes an ink ejecting section that ejects ink from a nozzle, an ink circulation path including an ink flow path through which the ink can be supplied to an ink ejecting section and an ink return path through which the ink supplied to the ink ejecting section is returned, a warming device including a temperature control module provided in the ink circulation path, where the warming device can heat the ink in the temperature control module, and a feed pump that can flow the ink in the ink circulation path, wherein the flow rate of the ink, in the ink circulation path, heated by the warming device is adjusted.

14 Claims, 6 Drawing Sheets

(56) References Cited

U.S. PATENT DOCUMENTS

| | | | |
|---|---|---|---|
| 2016/0001578 | A1 | 1/2016 | Kobayashi et al. |
| 2016/0059564 | A1 | 3/2016 | Ohtsu et al. |
| 2018/0154658 | A1 | 6/2018 | Kobayashi et al. |
| 2020/0247146 | A1 | 8/2020 | Kobayashi et al. |

FOREIGN PATENT DOCUMENTS

| | | | |
|---|---|---|---|
| JP | 2003-127417 | A | 5/2003 |
| JP | 2005-059476 | A | 3/2005 |
| JP | 2007-021723 | A | 2/2007 |
| JP | 2007-190703 | A | 8/2007 |
| JP | 2009-023230 | A | 2/2009 |
| JP | 2009-148976 | A | 7/2009 |
| JP | 2011-207064 | A | 10/2011 |
| JP | 2014-180857 | A | 9/2014 |
| JP | 2014-208421 | A | 11/2014 |
| JP | 2015-000518 | A | 1/2015 |
| JP | 2016-049738 | A | 4/2016 |
| JP | 2016-137580 | A | 8/2016 |
| JP | 2016-179654 | A | 10/2016 |
| JP | 2019-069608 | | 5/2019 |
| WO | WO15/098220 | A | 7/2015 |
| WO | WO17/094518 | A | 8/2017 |

* cited by examiner

LIQUID EJECTING APPARATUS AND MAINTENANCE METHOD OF LIQUID EJECTING APPARATUS

The present application is based on, and claims priority from JP Application Serial Number 2020-134456, filed Aug. 7, 2020, the disclosure of which is hereby incorporated by reference herein in its entirety.

BACKGROUND

1. Technical Field

The present disclosure relates to a liquid ejecting apparatus such as a printer and a method of maintaining the liquid ejecting apparatus.

2. Related Art

In the related art, as shown in JP-A-2003-127417, an ink jet printer is known as an example of a liquid ejecting apparatus capable of ejecting ink by heating the ink with high-viscosity in a supply path to reduce the viscosity. This ink jet printer includes a recording head that ejects the ink, an ink tank that stores ink, a supply path through which the ink is supplied from the ink tank to the recording head, a temperature detection unit that detects the temperature of the ink, a supply path heating unit that heats the ink in the supply path, and a heating controller that controls the supply path heating unit based on the detection result by the temperature detection unit.

However, when the temperature of the ink of the recording head is adjusted by controlling the supply path heating unit based on the detection result by the temperature detection unit as in the ink jet printer described in JP-A-2003-127417, there is a problem that the temperature of the supply path heating unit is required to be controlled frequently.

SUMMARY

According to an aspect of the present disclosure, a liquid ejecting apparatus includes a liquid ejecting section that ejects a liquid from a nozzle, a circulation flow path including a supply flow path through which the liquid is supplied to the liquid ejecting section and a return flow path through which the liquid supplied to the liquid ejecting section is returned, a warming mechanism including a temperature control module provided in the circulation flow path, where the warming mechanism is configured to heat the liquid in the temperature control module, a flow mechanism that flows the liquid in the circulation flow path, a state detection unit that detects a state of the liquid in the liquid ejecting section, and controller, wherein the controller controls the flow mechanism based on a viscosity of the liquid, in the liquid ejecting section, estimated from the detection result detected by the state detection unit to adjust a flow rate of the liquid, in the circulation flow path, heated by the warming mechanism.

According to an aspect of the present disclosure, in a method of maintaining a liquid ejecting apparatus including a liquid ejecting section that ejects a liquid from a nozzle, a circulation flow path including a supply flow path through which the liquid is supplied to the liquid ejecting section and a return flow path through which the liquid supplied to the liquid ejecting section is returned, a warming mechanism including a temperature control module provided in the circulation flow path, where the warming mechanism is configured to heat the liquid in the temperature control module, and a flow mechanism that flows the liquid in the circulation flow path, the method includes adjusting a flow rate of the liquid, in the circulation flow path, heated by the warming mechanism.

DESCRIPTION OF EXEMPLARY EMBODIMENTS

1. First Embodiment

Hereinafter, the first embodiment of the liquid ejecting apparatus and the maintenance method of the liquid ejecting apparatus will be described with reference to the drawings. The liquid ejecting apparatus is an ink jet printer that ejects the ink, which is an example of a liquid, onto a medium such as printing paper to print an image such as a character or a photograph.

Figure 1:
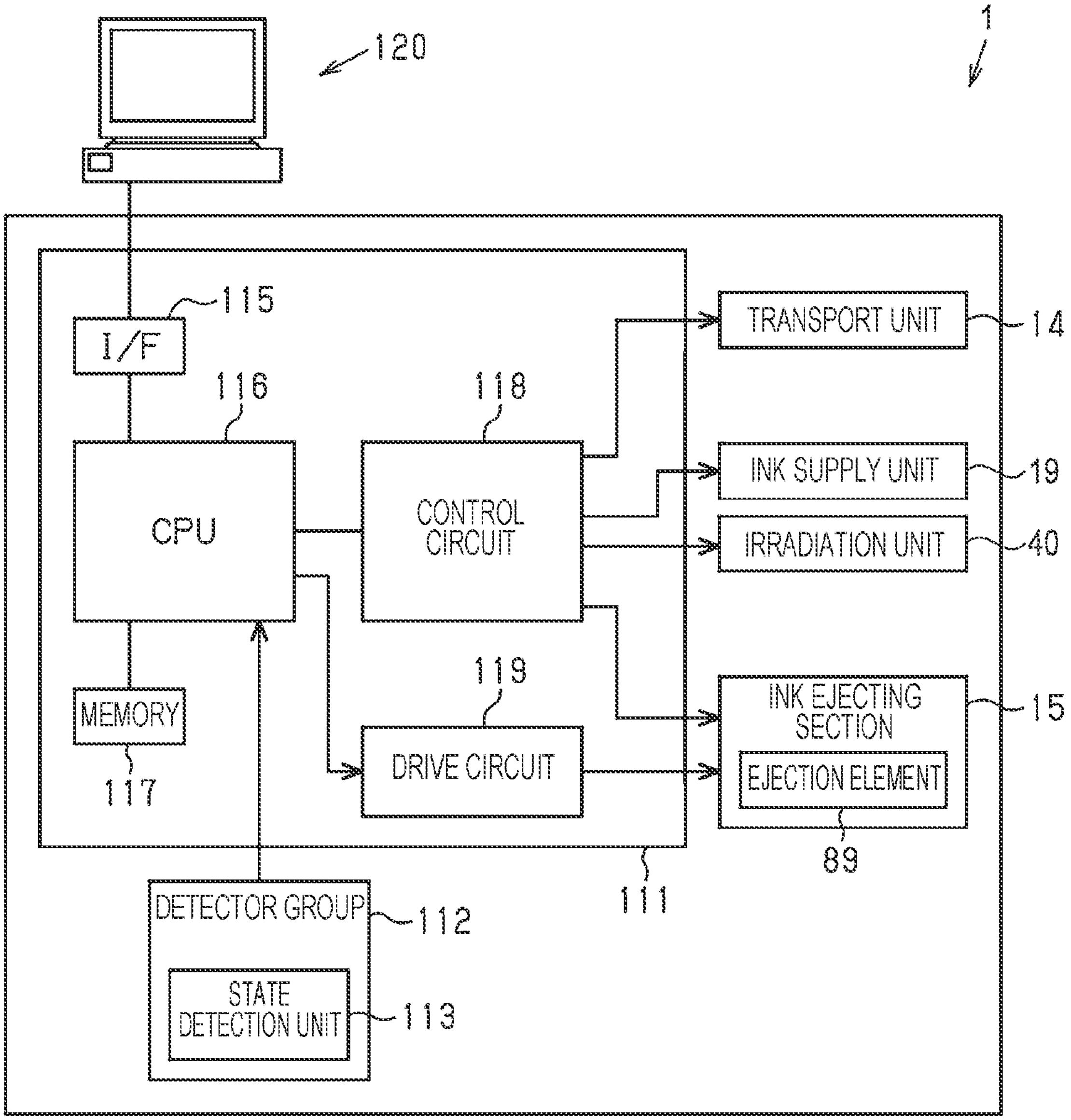
FIG. 1 is a block diagram showing a configuration of a liquid ejecting apparatus.

FIG. 1 is a block diagram showing a configuration of a printer 1 as a liquid ejecting apparatus according to the first embodiment. A computer 120 outputs print data corresponding to an image to the printer 1 in order to cause the printer 1 to print the image. The printer 1 is a liquid ejecting apparatus that prints an image on printing paper as a medium, and is communicatively connected to the computer 120.

The printer 1 includes an ink supply unit 19, a transport unit 14, an ink ejecting section 15 as a liquid ejecting section, an irradiation unit 40, a detector group 112, and a controller 111. The detector group 112 includes a state detection unit 113 capable of detecting the state of the ink in the ink ejecting section 15. The printer 1 that has received the print data from the computer 120 controls the ink supply unit 19, the transport unit 14, the ink ejecting section 15, and the irradiation unit 40 by the controller 111, and prints an image on the printing paper according to the print data. The situation in the printer 1 is monitored by the detector group 112, and the detector group 112 outputs the detection result to the controller 111.

The controller 111 includes an interface unit 115, a CPU 116, a memory 117, a control circuit 118, and a drive circuit 119. The interface unit 115 transmits/receives data between the computer 120 and the printer 1. The drive circuit 119 generates a drive signal for driving an ejection element 89 included in the ink ejecting section 15.

The CPU 116 is an arithmetic processing unit. The memory 117 is a storage device that secures an area for storing the program of the CPU 116 or a work area, and has a storage element such as a RAM or an EEPROM. The CPU 116 controls the ink supply unit 19, the transport unit 14, the ink ejecting section 15, the irradiation unit 40, and the like via the control circuit 118 according to the program stored in the memory 117.

Figure 2:
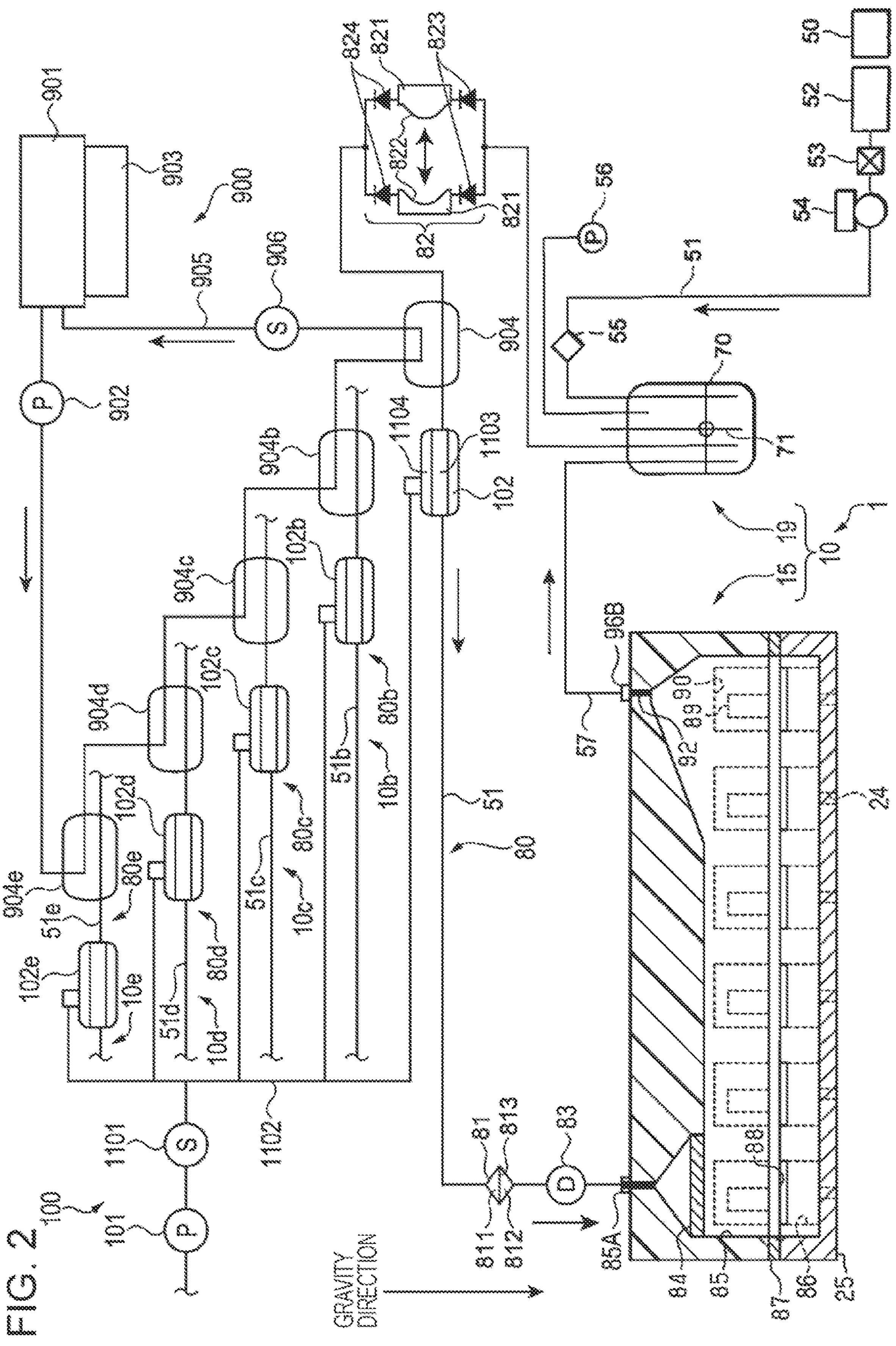
FIG. 2 is an explanatory diagram schematically showing a liquid ejecting unit in the liquid ejecting apparatus.

FIG. 2 shows an example of a liquid ejecting unit included in the printer 1. An ink ejecting unit 10 as a liquid ejecting unit includes the ink ejecting section 15 that ejects the ink from a nozzle 24 and the ink supply unit 19. The ink supply unit 19 is located between an ink cartridge 50 as a liquid supply source and the ink ejecting section 15 of the printer 1. The ink supply unit 19 includes a holder 52 that mounts the ink cartridge 50, an ink flow path 51, as a supply flow path, capable of supplying the ink to the ink ejecting section 15, an ink return path 57, as a return flow path, together with the ink flow path 51 forming an ink circulation path 80 as a circulation flow path so that the ink supplied to the ink ejecting section 15 can be returned, a valve 53 that opens/closes the ink flow path 51, a sub tank 70 as a liquid storage unit, a supply pump 54 that supplies the ink in the ink cartridge 50 to the sub tank 70, a filter 55 that filters the ink supplied to the sub tank 70, a feed pump 82 as a flow mechanism, a warming device 900 as a warming mechanism, a degassing device 100 as a degassing mechanism, a filter unit 81, and a damper unit 83. The printer 1 of the present embodiment includes a plurality of ink ejecting units 10 so as to correspond to five types of inks: black ink, cyan ink, magenta ink, yellow ink, and white ink. The ink used in the embodiment is an ultraviolet curable ink that is cured when the ink is irradiated with ultraviolet rays. In FIG. 2, for the sake of explanation, five liquid ejecting units are denoted by ink ejecting units 10, 10*b*, 10*c*, 10*d*, and 10*e*.

The ink supply unit 19 includes the sub tank 70 that stores the ink in the ink flow path 51. The sub tank 70 is coupled to the ink flow path 51 so that the ink is supplied from the ink cartridge 50. The ink flow path 51 couples the sub tank 70 and a supply port 85A of the ink ejecting section 15 so that the ink stored in the sub tank 70 can be supplied to the ink ejecting section 15. The internal space of the sub tank 70 is open to the atmosphere at the time of printing. The liquid surface of the ink stored in the sub tank 70 is located below a nozzle face 25 where the nozzle 24 of the ink ejecting section 15 is opened in the direction of gravity shown in FIG. 2, and is the atmospheric pressure applied to the liquid surface is adjusted so as to be a pressure at which the meniscus, as a gas-liquid interface, formed in the nozzle 24 is not broken, for example, a gauge pressure of −1000 Pa to −3500 Pa. Then, when the ink in the sub tank 70 is consumed by the printing operation, the position of the liquid surface of the ink to be stored is adjusted by driving the supply pump 54 to replenish the ink from the ink cartridge 50. Further, the sub tank 70 is coupled to the pressurizing pump 56 so as to be able to pressurize the internal space, and the pressure applied to the stored ink may be adjusted to the pressure at which the meniscus of the nozzle 24 is broken to perform pressure cleaning in which the ink is forcibly discharged from the nozzle 24 of the ink ejecting section 15. The sub tank 70 is provided with a liquid amount sensor 71 that detects the amount of ink stored in the sub tank 70.

The ink supply unit 19 includes the ink return path 57 capable of returning the ink supplied to the ink ejecting section 15 to the ink flow path 51. The ink return path 57 together with the ink ejecting section 15, the sub tank 70, and the ink flow path 51 forms the ink circulation path 80. In the present embodiment, the ink return path 57 couples a common liquid chamber side discharge port 96*b* of the ink ejecting section 15 and the sub tank 70 so that the ink discharged from the common liquid chamber side discharge port 96*b* of the ink ejecting section 15 flows to the ink flow path 51.

The ink supply unit 19 includes the feed pump 82 capable of flowing the ink in the ink circulation path 80. The feed pump 82 is interchangeably provided at a position between the sub tank 70 and the ink ejecting section 15 in the ink flow path 51. As shown in FIG. 2, the feed pump 82 includes a pump chamber 821, a suction-side flow path including a suction-side one-way valve 823 that is located on the sub tank 70 side of the pump chamber 821 and that allows the ink to flow toward the pump chamber 821 and prevents the ink from flowing toward the sub tank 70, and an ejection-side flow path including an ejection-side one-way valve 824 that is located on the ink ejecting section 15 side of the pump chamber 821 and that allows the ink to flow toward the ink ejecting section 15 and prevents the ink from flowing toward the pump chamber 821. The feed pump 82 of the present embodiment is a diaphragm pump that is classified into a positive displacement pump that feeds a liquid by repeating a suction operation in which a diaphragm 822 formed of a flexible member as a flexible wall is deformed in a direction in which the volume of the pump chamber 821 increases, and an ejection operation in which the diaphragm 822 is deformed in a direction in which the volume of the pump chamber 821 decreases.

The feed pump 82 is a two-phase system which includes two suction-side flow paths, two pump chambers 821, and two ejection-side flow paths, and that reduces pressure fluctuations in the feed liquid by shifting the phase of the repetitive operation including the suction operation and the ejection operation by 180 degrees. The flow rate of the ink fed by the feed pump 82 is preferably 10 g/min or more from the viewpoint of ensuring the printing speed by supplying the ink amount required for printing to the ink ejecting section 15. In this case, the lower limit flow rate at the time of printing is 10 g/min. The upper limit flow rate of the ink is preferably 400 g/min or less from the viewpoint of stabilizing the meniscus formed in the nozzle 24 of the ink ejecting section 15. The feed pump 82 may be a tube pump classified into a positive displacement pump that feeds a liquid by deforming a tube as a flexible pump chamber forming part of the ink flow path 51 with a roller.

The ink supply unit 19 includes the warming device 900 capable of heating the ink in the ink circulation path 80. While the warming mechanism is not particularly limited as long as it can heat the ink, the warming device 900 of the present embodiment includes a temperature control module 904 provided in the ink circulation path 80 as shown in FIG. 2. The temperature control module 904 is provided between the feed pump 82 in the ink flow path 51 and the ink ejecting section 15. The warming device 900 can heat the ink in the temperature control module 904 by circulating the hot water in a hot water tank 901 between the temperature control module 904 and the hot water tank 901 by a hot water circulation pump 902.

As shown in FIG. 2, the warming device 900 of the present embodiment includes a hot water circulation path 905 that couples the five temperature control modules 904, 904*b*, 904*c*, 904*d*, and 904*e* provided in the ink circulation paths 80, 80*b*, 80*c*, 80*d*, and 80*e* of the five ink ejecting units 10, 10*b*, 10*c*, 10*d*, 10*e*, respectively, and a hot water tank 901. The hot water circulation path 905 is provided with a hot water temperature sensor 906 as the detector group 112, and the controller 111 controls a heater 903 of the hot water tank 901 based on the temperature, of the hot water, detected by the hot water temperature sensor 906 to adjust collectively the temperature of the ink in the five temperature control modules 904 to a set temperature.

The controller 111 of the printer 1 controls the feed pump 82 provided in the ink circulation path 80 of each of the five ink ejecting units 10 to adjust, for each ink ejecting unit 10, the flow rate of the ink, in the ink circulation path 80 in each of the temperature control modules 904, heated to substantially the same temperature by the warming device 900, and adjust, to a predetermined viscosity, the viscosity of the ink, in the ink ejecting section 15, estimated from the detection result detected by each state detection unit 113. The predetermined viscosity of the ink in the ink ejecting section 15 in the present embodiment is 5 to 15 mPa·s. From the temperature characteristics of the ink and the predetermined viscosity of the ink in the ink ejecting section 15 in the present embodiment, the predetermined temperature of the ink in the ink ejecting section 15 is more preferably 28 to 45° C. In this case, the lower limit temperature of the ink in the ink ejecting section 15 is 28° C.

The ink supply unit 19 includes the degassing device 100 capable of degassing the ink in the ink circulation path 80. While the degassing mechanism is not particularly limited as long as it can degas the ink, but the degassing device 100 of the present embodiment includes a degassing module 102 provided in the ink circulation path 80. The degassing module 102 of the present embodiment is provided between the temperature control module 904 in the ink flow path 51 and the ink ejecting section 15. As shown in FIG. 2, the degassing module 102 is located downstream of the temperature control module 904 in the ink flow direction in the ink flow path 51. As a result, the degassing device 100 can degas the ink in a high temperature state, and the degassing efficiency can be further increased.

The degassing module 102 includes a degassing chamber 1103 into which the ink flows, and a decompression chamber 1104 that contacts the degassing chamber 1103 via a separation membrane that does not allow a liquid such as the ink to pass through. A decompression pump 101 as a vacuum degree adjustment mechanism decompresses the decompression chamber 1104. When the decompression chamber 1104 is decompressed, the degree of vacuum in the decompression chamber 1104 increases, so that the ink in the degassing chamber 1103 is degassed and the amount of dissolved gas decreases. Then, the degassed ink in the degassing chamber 1103 circulates in the ink circulation path 80, so that the growth of air bubbles and the generation of air bubbles in the ink in the ink circulation path 80 including the inside of the ink ejecting section 15 are suppressed. That is, the degassing device 100 can degas the ink in the ink circulation path 80 by decompressing the degassing module 102 and increasing the degree of vacuum of the degassing module 102.

As shown in FIG. 2, the degassing device 100 of the present embodiment includes a decompression path 1102 coupling the decompression chamber 1104 of each of the degassing modules 102, **102*b*, 102*c*, 102*d*, and 102*e* of the five ink ejecting units 10, 10*b*, 10*c*, 10*d*, and 10*e*, respectively, and the decompression pump 101. Further, a pressure sensor 1101 as the detector group 112 is provided between the degassing modules 102, 102*b*, 102*c*, 102*d*, and 102*e*, and the decompression pump 101 in the decompression path 1102, and based on the pressure value detected by the pressure sensor 1101, the controller 111 causes the decompression pump 101 to adjust collectively the degree of vacuum of the degassing modules 102, 102*b*, 102*c*, 102*d*, and 102*e***.

The amount of dissolved oxygen in the ink, which is an example of the dissolved gas amount of the ink in the ink circulation path 80, is determined by the amount of dissolved oxygen in the ink contained in the ink cartridge 50 and the degassing ability to be degassed by the degassing device 100, specifically, the ability of the decompression pump 101 that adjusts the degree of vacuum in the degassing module 102. As the ink is consumed, the undegassed ink is sequentially replenished from the sub tank 70 to the ink circulation path 80, and when oxygen supplied from the outside is dissolved in the ink during a process in which the ink is fed from the ink cartridge 50 to the ink circulation path 80 and during circulation, the amount of dissolved oxygen in the ink increases slightly. Further, the degassing ability to be degassed by the degassing device 100 changes depending on the flow rate of the ink flowing in the degassing module 102. For example, even when the degree of vacuum of the degassing module 102 is constant, when the flow rate of the ink in the ink circulation path 80 is decreased, the amount of dissolved oxygen in the ink in the ink circulation path 80 decreases, and when the flow rate of the ink in the ink circulation path 80 is increased, the amount of dissolved oxygen in the ink in the ink circulation path 80 increases.

In this case, the degassing device 100 is provided at a position between the feed pump 82 in the ink flow path 51 forming part of the ink circulation path 80 and the ink ejecting section 15, and the controller 111 causes the decompression pump 101 to adjust the degree of vacuum of the degassing module 102 so that the amount of dissolved oxygen in the ink flowing into the degassing module 102 in the ink circulation path 80 is within a predetermined range. As a result, the ink whose amount of dissolved oxygen is adjusted to a predetermined range can be supplied to the ink ejecting section 15. Therefore, it is possible to reduce the accumulation of air bubbles in the ink ejecting section 15, and improve ejection stability of the ink from the ink ejecting section 15.

In a case where the flow rate of the ink in the ink circulation path 80 is the same, when the degree of vacuum of the degassing module 102 is increased, the amount of dissolved oxygen in the ink in the ink circulation path 80 is decreased, and when the degree of vacuum of the degassing module 102 is decreased, the amount of dissolved oxygen in the ink in the ink circulation path 80 increases. Therefore, the degree of vacuum of the degassing module 102 required to supply the ink whose amount of dissolved oxygen is the upper limit value in a predetermined range to the ink ejecting section 15 at the flow rate is the lower limit degree of vacuum.

The ink supply unit 19 includes the filter unit 81 that filters foreign matter in the ink. As shown in FIG. 2, the filter unit 81 of the present embodiment is provided interchangeably between the degassing module 102 in the ink flow path 51 and the ink ejecting section 15. The filter unit 81 includes a filter 813, an upstream filter chamber 811, located toward the sub tank 70, and a downstream filter chamber 812 located toward the ink ejecting section 15, which are partitioned by the filter 813. The filter unit 81 is provided above the nozzle face 25 of the ink ejecting section 15 with a posture in which the upstream filter chamber 811 is above the downstream filter chamber 812 in the direction of gravity and. As shown in FIG. 2, when a head filter 84 is provided in the ink ejecting section 15, it is preferable that the filtration particle size of the filter 813 be set to 5 μm, which is smaller than the filtration particle size of the head filter 84, which is, for example, 10 μm to 20 μm, and the filter area of the filter 813 is set to larger than that of the head filter 84.

The ink supply unit 19 includes the damper unit 83 that reduces pressure fluctuations of the ink in the ink flow path 51. As shown in FIG. 2, the damper unit 83 of the present embodiment is provided interchangeably between the filter unit 81 in the ink flow path 51 and the ink ejecting section 15. The damper unit 83 is provided at a position below the filter unit 81 and above the nozzle face 25 of the ink ejecting section 15 in the direction of gravity.

Next, the ink ejecting section 15 in the embodiment will be described. As shown in FIG. 2, the ink ejecting section 15 has the supply port 85A through which the ink can flow into the ink ejecting section 15. The supply port 85A is coupled to the ink flow path 51 so that the ink can be supplied to the ink ejecting section 15. The ink ejecting section 15 has a common liquid chamber 85 that communicates with the supply port 85A. The ink ejecting section 15 includes the head filter 84 that filters the supplied ink. The head filter 84 captures air bubbles, foreign matter, and the like in the supplied ink. The head filter 84 is provided in the common liquid chamber 85 with which the ink flow path 51 communicates.

The ink ejecting section 15 includes a plurality of individual liquid chambers 86 that communicate with the common liquid chamber 85. One nozzle 24 is correspondingly provided in one individual liquid chamber 86. Part of the wall face of the individual liquid chamber 86 is formed by a vibration plate 87. The common liquid chamber 85 and the plurality of individual liquid chambers 86 communicate with each other via a supply side communication passage 88. The plurality of nozzles 24 communicates with the common liquid chamber 85 via the corresponding individual liquid chambers 86, and are open to the nozzle face 25.

The ink ejecting section 15 includes a plurality of ejection elements 89 and a plurality of accommodation chambers 90 each of which accommodates the ejection element 89. The accommodation chambers 90 are disposed at a position different from that of the common liquid chamber 85. One accommodation chamber 90 accommodates one ejection element 89. The ejection element 89 is provided on a face, of the vibration plate 87, opposite to a face, of the vibration plate 87, facing the individual liquid chamber 86. The ink ejecting section 15 is provided in the printer 1 so that the ink in the individual liquid chambers 86 can be ejected as ink droplets from the plurality of nozzles 24 by driving the ejection element 89.

The ejection element 89 of the present embodiment is composed of a piezoelectric element that contracts when a drive voltage is applied. When the application of the drive voltage to the ejection element 89 is released after the vibration plate 87 is deformed by the contraction of the ejection element 89 due to the application of the drive voltage, the ink in the individual liquid chamber 86 whose volume has changed is ejected from the nozzle 24 as the ink droplets.

As shown in FIG. 2, the ink ejecting section 15 has the common liquid chamber side discharge port 96B as a discharge port capable of discharging the supplied ink to the outside without the ink passing through the nozzle 24. The ink ejecting section 15 has a common liquid chamber side discharge flow path 92 that communicates with the common liquid chamber side discharge port 96B. As a result, the common liquid chamber 85 and the common liquid chamber side discharge flow path 92 of the ink ejecting section 15 constitute part of the ink circulation path 80.

Next, a method of estimating the state in the individual liquid chamber 86 as the state of the ink in the ink ejecting section 15 will be described based on the detection result by the state detection unit 113. When a voltage is applied to the ejection element 89 by a signal from the drive circuit 119, the vibration plate 87 bends and deforms. As a result, pressure fluctuations occur in the individual liquid chamber 86. Due to the fluctuations, the vibration plate 87 vibrates for a while. This vibration is referred to as a residual vibration. From the state of this residual vibration, it is possible to estimate the state of the range including the individual liquid chamber 86 and the nozzle 24 communicating with the individual liquid chamber 86.

Figure 3:
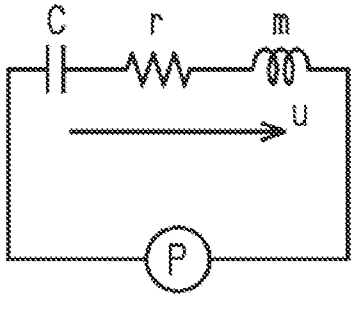
FIG. 3 is a diagram showing a calculation model of simple vibration assuming residual vibration of a vibration plate.

FIG. 3 is a diagram showing a calculation model of a simple vibration assuming a residual vibration of the vibration plate 87. When the drive circuit 119 applies a drive signal to the ejection element 89, the ejection element 89 expands and contracts according to the voltage of the drive signal. The vibration plate 87 bends according to the expansion and contraction of the ejection element 89. As a result, the volume of the individual liquid chamber 86 expands and then contracts. At this time, due to the pressure generated in the individual liquid chamber 86, part of the ink with which the individual liquid chamber 86 is filled is ejected as the ink droplets from the nozzle 24.

During the series of operations of the vibration plate 87 described above, the vibration plate 87 freely vibrates at a natural vibration frequency that is determined by the shape of the flow path through which the ink flows, a flow path resistance r due to the viscosity of the ink and the like, an inertance m due to the weight of the ink in the flow path, and a compliance C of the vibration plate 87. The free vibration of the vibration plate 87 is the residual vibration.

The calculation model of the residual vibration of the vibration plate 87 shown in FIG. 3 can be represented by the pressure P, the inertance m, the compliance C, and the flow path resistance r. When the step response when the pressure P is applied to the circuit of FIG. 3 is calculated for a volume velocity u, the following equation is obtained.

$$u = \frac{P}{\omega \cdot m} e^{-\omega t} \cdot \sin\omega t \tag{1}$$

$$\omega = \sqrt{\frac{1}{m \cdot C} - \alpha^2} \tag{2}$$

$$\alpha = \frac{r}{2m} \tag{3}$$

Figure 4:
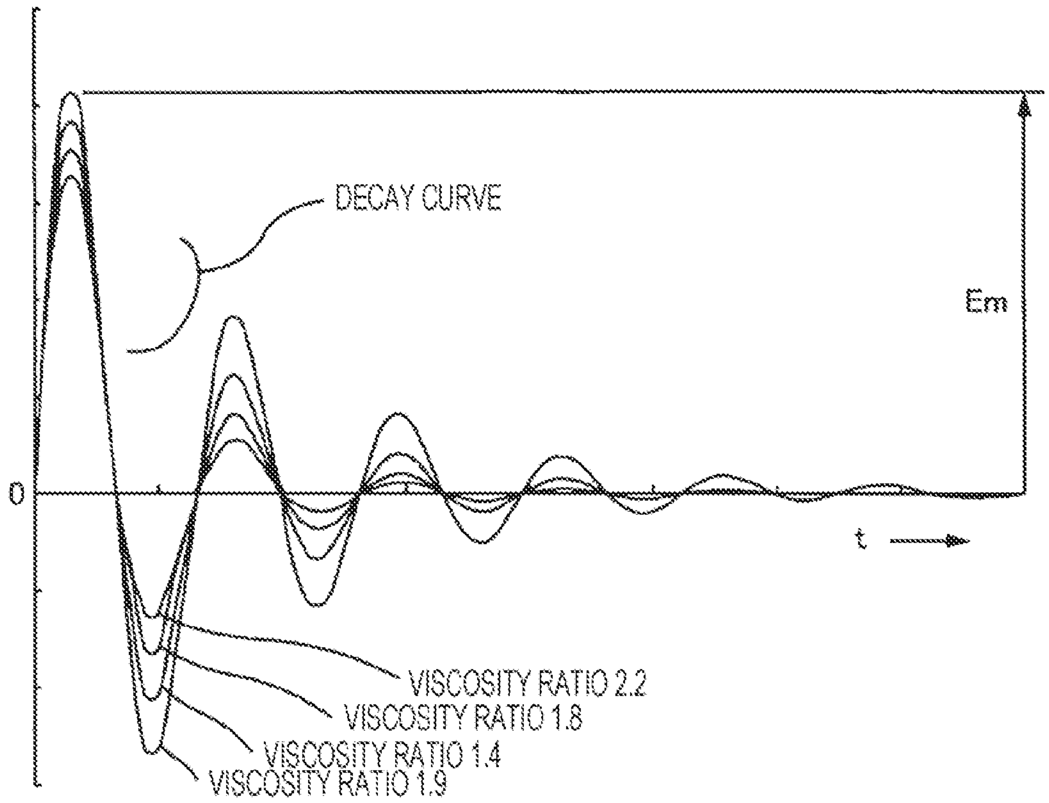
FIG. 4 is an explanatory diagram illustrating the relationship between the thickening of the liquid and the residual vibration waveforms.

FIG. 4 is an explanatory diagram of the relationship between the viscosity of the ink and the residual vibration waveform. The horizontal axis of FIG. 4 represents time t and the vertical axis represents the magnitude of the residual vibration. Em in FIG. 4 is a peak value of the first half wave in the residual vibration waveform. For example, when the ink near the nozzle 24 is dried or the temperature of the ink in the ink ejecting section 15 is lowered, the viscosity of the ink is increased, that is, the ink is thickened. As the viscosity of the ink increases, the flow path resistance r increases, so that the damping of the vibration cycle and the residual vibration increase.

Figure 5:
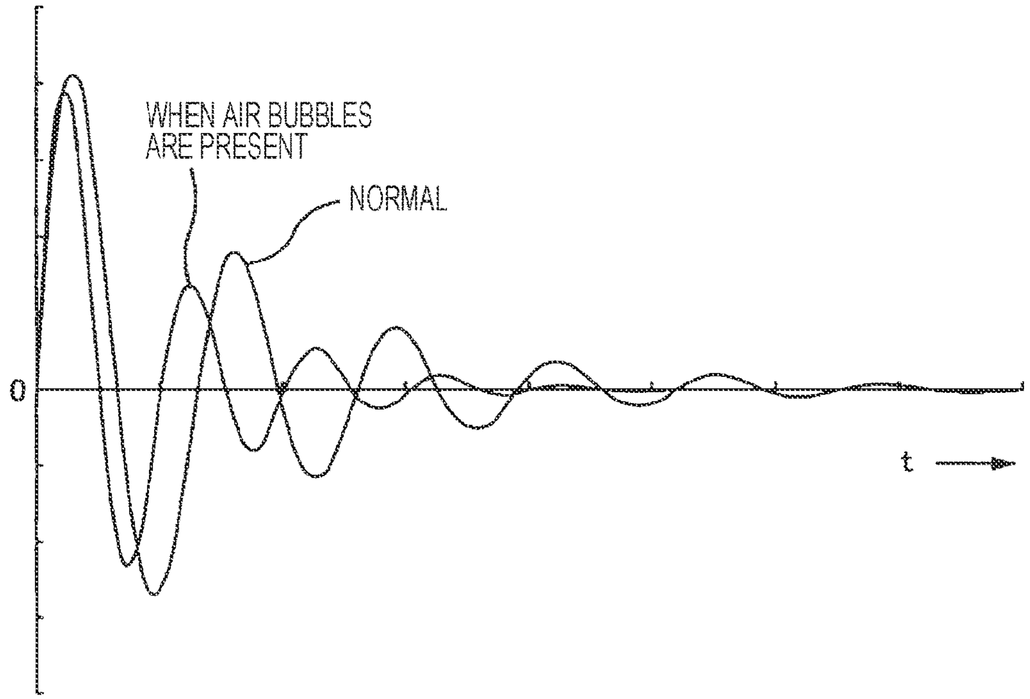
FIG. 5 is an explanatory diagram illustrating the relationship between air bubbles and residual vibration waveforms.

FIG. 5 is an explanatory diagram of the relationship between the air bubble and the residual vibration waveform. The horizontal axis of FIG. 5 represents time t and the vertical axis represents the magnitude of the residual vibration. For example, when air bubbles are present in any of the inks in the individual liquid chamber 86 and the nozzle 24, the inertance m, which is the ink weight, decreases by the volume of the air bubbles, compared with that when the state of the individual liquid chamber 86 and the nozzle 24 is normal. When m decreases, the angular velocity ω increases by the equation (2), so that the vibration cycle is shorter. That is, the vibration frequency is high.

The frequency of the vibration waveform detected in the state in which air bubbles are present in the individual liquid chamber 86 and the nozzle 24 filled with the ink is higher than the frequency of the vibration waveform detected in the state in which no air bubbles are present in the ink-filled individual liquid chamber 86 and the nozzle 24. The frequency of the vibration waveform detected in the state in which the individual liquid chamber 86 and the nozzle 24 are filled with air is higher than the frequency of the vibration waveform detected in the state in which air bubbles are present in the individual liquid chamber 86 and the nozzle 24 filled with the ink. Further, the larger the volume of air bubbles existing in either the individual liquid chamber 86 filled with the ink or the ink in the nozzle 24, the higher the frequency of the vibration waveform.

On the other hand, for example, when the ink adheres to the nozzle face 25, and the ink adhering to the nozzle face 25 is coupled to the ink in the nozzle 24, the ink adhering to the nozzle face 25 is coupled to the ink with which the individual liquid chamber 86 is filled via the nozzle 24, so that it is conceivable that the ink weight, that is, the inertance m, increases as the amount of ink adhering to the nozzle face 25 when viewed from the vibration plate 87 increases, compared with that when the state of the nozzle 24 is normal. Therefore, when the ink adhering to the nozzle face 25 is coupled to the ink in the individual liquid chamber 86, the frequency is lower than the frequency at the normal time.

In addition, when foreign matter such as paper dust adheres near the opening of the nozzle 24, the amounts of ink in the individual liquid chamber 86 and the seeping ink as viewed from the vibration plate 87 increases, compared with that when the state of the nozzle 24 is normal, so that it is conceivable that the inertance m increases. It is conceivable that the flow path resistance r is increased by the fibers of the paper dust attached to the vicinity of the outlet of the nozzle 24. Therefore, when paper dust attaches to the vicinity of the opening of the nozzle 24, the frequency is lower than that at the time of normal ejection.

When the ink is thickened, air bubbles are mixed in, or foreign matter is stuck, the state in the nozzle 24 and the individual liquid chamber 86 is not normal, so that the ink is typically not ejected from the nozzle 24. Therefore, a missing dot occurs in an image printed on the printing paper. Even when the ink droplets are ejected from the nozzle 24, the amount of the ink droplets may be small, or the flight direction of the ink droplets may be deviated and the ink droplets may not land at the target position. The nozzle 24 in which such ejection failure occurs is referred to as an abnormal nozzle.

As described above, the residual vibration of the individual liquid chamber 86 communicating with the abnormal nozzle is different from the residual vibration of the individual liquid chamber 86 communicating with the normal nozzle 24. Therefore, the state detection unit 113 detects the vibration waveform of the individual liquid chamber 86. Based on the detection result by the state detection unit 113, the controller 111 estimates the state of the range including the individual liquid chamber 86 and the nozzle 24 leading to the individual liquid chamber 86.

The controller 111 estimates whether the state of the ink ejecting section 15 is normal or abnormal based on the vibration waveform, of the individual liquid chamber 86, which is the detection result by the state detection unit 113. When the state in the individual liquid chamber 86 is abnormal, the nozzle 24 communicating with the individual liquid chamber 86 is estimated to be an abnormal nozzle. Based on the vibration waveform of the individual liquid chamber 86, the controller 111 estimate whether the state in the individual liquid chamber 86 is abnormal due to the presence of air bubbles, or the state in the individual liquid chamber 86 is abnormal due to thickening of the ink. Based on the vibration waveform of the individual liquid chamber 86, the controller 111 estimates the total volume of air bubbles existing in the individual liquid chamber 86 and the nozzle 24 communicating with the individual liquid chamber 86, and the degree of thickening of the ink in the individual liquid chamber 86 and the nozzle 24 communicating with the individual liquid chamber 86.

The controller 111 may estimate whether the head filter 84 is normal from the detection result detected by the state detection unit 113. When the head filter 84 is clogged, the flow of the ink passing through the head filter 84 tends to be stagnant. When the ink flow is stagnant, air tends to come in from the nozzle 24, and air bubbles tend to accumulate in the individual liquid chamber 86. Therefore, the controller 111 estimates that the head filter 84 has an abnormality based on the detected abnormality due to the air bubbles in the individual liquid chamber 86.

Specifically, for example, the controller 111 estimates that the head filter 84 has an abnormality when an abnormality occurs due to the air bubbles in a predetermined number or more of the individual liquid chambers 86 of the plurality of individual liquid chambers 86. The predetermined number is, for example, a number which is not enough to perform complementary printing in which the ink to be ejected from the abnormal nozzle is supplemented with the ink ejected from the surrounding nozzles 24.

The controller 111 estimates the viscosity of the ink in the individual liquid chamber 86 as the state of the ink in the ink ejecting section 15 based on the vibration waveform, of the individual liquid chamber 86, which is the detection result detected by the state detection unit 113. For example, the controller 111 compares the vibration waveform, of the individual liquid chamber 86, detected by the state detection unit 113 when the viscosity of the ink in the individual liquid chamber 86 is within a predetermined viscosity range with the vibration waveform, of the individual liquid chamber 86, which is the detection result detected by the state detection unit 113 to estimate the viscosity of the ink in the individual liquid chamber 86 to determine whether the viscosity of the ink in the individual liquid chamber 86 is in the predetermined viscosity range, lower than the predetermined viscosity range, or higher than the predetermined viscosity range. Information about the vibration waveform, of the individual liquid chamber 86, detected by the state detection unit 113 when the viscosity of the ink in the individual liquid chamber 86 is within the predetermined viscosity range is stored in the memory 117 of the controller 111. Further, the information about the vibration waveform, of the individual liquid chamber 86, which is the detection result detected by the state detection unit 113, and the viscosity of the ink in the individual liquid chamber 86 estimated from the detection result together with the detection time are stored as a detection history in the memory 117 of the controller 111.

The controller 111 estimates the degree of degassing of the ink in the ink ejecting section 15 based on the vibration waveform, of the individual liquid chamber 86, which is the detection result detected by the state detection unit 113. When the air bubbles in the ink that has been degassed to a predetermined degree of degassing or higher and whose amount of dissolved gas is small are present, the volume of the air bubbles decreases with the passage of time. In addition, the air bubbles are unlikely to generate in the ink degassed at a predetermined degree of degassing or higher. Therefore, the controller 111 estimates that the degree of degassing of the ink in the ink ejecting section 15 is a predetermined degree of degassing when the total volume of air bubbles, existing in the individual liquid chamber 86, estimated from the vibration waveform, of the individual liquid chamber 86, which is the detection result detected by the state detection unit 113, is less than the total volume of air bubbles, existing in the individual liquid chamber 86, estimated from the vibration waveform of the individual liquid chamber 86 detected before a predetermined time, and estimates that the degree of degassing of the ink in the ink ejecting section 15 is lower than the predetermined degree of degassing when the total volume of air bubbles, existing in the individual liquid chamber 86, estimated from the vibration waveform, of the individual liquid chamber 86, which is the detection result detected by the state detection unit 113, is equal to or larger than the total volume of air bubbles, existing in the individual liquid chamber 86, estimated from the vibration waveform of the individual liquid chamber 86 detected before the predetermined time.

Alternatively, the controller 111 estimates that the degree of degassing of the ink in the ink ejecting section 15 is equal to or higher than the predetermined degree of degassing when the total volume of air bubbles, existing in the individual liquid chamber 86, estimated from the vibration waveform, of the individual liquid chamber 86, which is the detection result detected by the state detection unit 113, is equal to or smaller than the predetermined value, and estimates that the degree of degassing of the ink in the ink ejecting section 15 is lower than the predetermined degree of degassing when the total volume of air bubbles, existing in the individual liquid chamber 86, estimated from the vibration waveform, of the individual liquid chamber 86, which is the detection result detected by the state detection unit 113, is larger than the predetermined value. The predetermined value is stored in the memory 117 of the controller 111. Further, the total volume of air bubbles existing in the individual liquid chamber 86 estimated from the detection result detected by the state detection unit 113 and the degree of degassing of the ink in the ink ejecting section 15 together with the detection time are stored as a detection history in the memory 117 of the controller 111.

In the printer 1, when the temperature of the ink in the ink ejecting section 15 is lower than the predetermined temperature, the viscosity of the ink in the ink ejecting section 15 may be higher than the predetermined viscosity, and the ink may not be ejected normally from the nozzle 24. Therefore, the printer 1 is configured to perform a maintenance operation for adjusting the viscosity of the ink. The controller 111 of the present embodiment controls, as a maintenance operation for the printer 1, the feed pump 82 based on the viscosity of the ink, in the ink ejecting section 15, estimated from the detection result detected by the state detection unit 113 to adjust the flow rate of the ink, in the ink circulation path 80, heated by the warming device 900 to adjust the viscosity of the ink in the ink ejecting section 15 to a predetermined viscosity. Further, the controller 111 of the present embodiment, as the maintenance operation of the printer 1, controls the corresponding feed pump 82 based on the viscosity of the ink, in the ink ejecting section 15, estimated from the detection result detected by the state detection unit 113 of each of the five ink ejecting units 10.

For example, when an ink ejecting unit 10 is present in which the viscosity of the ink, in the ink ejecting section 15, estimated from the detection result detected by the state detection unit 113 with the flow rate sets to the set flow rate is lower than the predetermined viscosity, the controller 111 controls the feed pump 82 of the ink ejecting unit 10 so that the flow rate is smaller than the set flow rate. Further, for example, when an ink ejecting unit 10 is present in which the viscosity of the ink, in the ink ejecting section 15, estimated from the detection result detected by the state detection unit 113 with the flow rate set to the set flow rate is the predetermined viscosity, the controller 111 controls the feed pump 82 of the ink ejecting unit 10 so that the flow rate is maintained. Further, for example, when an ink ejecting unit 10 is present in which the viscosity of the ink, in the ink ejecting section 15, estimated from the detection result detected by the state detection unit 113 with the flow rate of the ink in the ink circulation path 80 set to the set flow rate is higher than the predetermined viscosity, the controller 111 controls the feed pump 82 of the ink ejecting unit 10 so that the flow rate is larger than the set flow rate.

Further, the controller 111 of the present embodiment controls, as a maintenance operation for the printer 1, the warming device 900 based on the viscosity of the ink, in the ink ejecting section 15, estimated from the detection result detected by the state detection unit 113 of each of the five ink ejecting units 10, the set flow rate when the detection result is detected, and the detection history related to the detection result stored in the memory 117 of the controller 111.

For example, when the viscosity of the ink, in the ink ejecting sections 15 of all the ink ejecting units 10, estimated from the detection result detected by the state detection unit 113 is lower than the predetermined viscosity, and the flow rate of the ink in the ink circulation path 80 is the lower limit flow rate, the controller 111 controls the warming device 900 so that the temperature of the ink in the temperature control module 904 is lower than the temperature of the ink, in the temperature control module 904, when the detection result is detected. The lower limit flow rate is stored in the memory 117 of the controller 111.

In addition, when the viscosity of the ink, in the ink ejecting sections 15 of all the ink ejecting units 10, estimated from the detection result detected by the state detection unit 113 is higher than the predetermined viscosity, and the flow rate of the ink in the ink circulation path 80 is the upper limit flow rate, the controller 111 controls the warming device 900 so that the temperature of the ink in the temperature control module 904 is higher than the temperature of the ink, in the temperature control module 904, when the detection result is detected. The upper limit flow rate is stored in the memory 117 of the controller 111. Further, for example, when it is estimated that the viscosity of the ink, in the ink ejecting sections 15 of all the ink ejecting units 10, estimated from the detection result detected by the state detection unit 113 is higher than the predetermined viscosity, and the viscosity of the ink is lower than the predetermined viscosity when the temperature of the ink in the temperature control module 904 is increased, the controller 111 may set the flow rate of the feed pump 82 to smaller than the set flow rate when the detection result is detected, and may control the warming device 900 so that the temperature of the ink in the temperature control module 904 is higher than the temperature of the ink, in the temperature control module 904, when the detection result is detected.

In the printer 1, when the degree of degassing of the ink in the ink ejecting section 15 is lower than the predetermined degree of degassing, air bubbles are likely to generate from the ink in the ink ejecting section 15 and the air bubbles are likely to stay in the ink, so that the ink may not be normally ejected from the nozzle 24. Therefore, the printer 1 is configured to perform a maintenance operation for adjusting the degree of degassing of the ink. The controller 111 of the present embodiment controls, as a maintenance operation of the printer 1, the degassing device 100 so that the degree of degassing of the ink, in the ink ejecting section 15, estimated from the detection result by the state detection unit 113 is the predetermined degree of degassing.

For example, when the degree of degassing of the ink, in the ink ejecting sections 15 of all the ink ejecting units 10, estimated from the detection result detected by the state detection unit 113 is lower than the predetermined degree of degassing, the controller 111 controls the degassing device 100 so that the degree of vacuum of the degassing module 102 is higher than the degree of vacuum of the degassing module 102 when the detection result is detected.

Further, for example, when an ink ejecting unit 10 is present in which the viscosity of the ink, in the ink ejecting section 15, estimated from the detection result detected by the state detection unit 113 with the flow rate set to the set flow rate is higher than the predetermined viscosity, and the degree of degassing of the ink, in the ink ejecting sections 15 of all the ink ejecting units 10, estimated from the detection result is lower than the predetermined degree of degassing, the controller 111 controls the feed pump 82 of the ink ejecting unit 10 so that the flow rate is larger than the set flow rate, and controls the degassing device 100 so that the degree of vacuum of the degassing module 102 is higher than the degree of vacuum of the degassing module 102 when the detection result is detected.

Further, considering that even when the degree of vacuum of the degassing module 102 is constant, the amount of dissolved oxygen in the ink in the ink circulation path 80 decreases when the flow rate of the ink in the ink circulation path 80 is decreased, and the amount of dissolved oxygen in the ink in the ink circulation path 80 increases when the flow rate of the ink in the ink circulation path 80 is increased, the degassing device 100 may be controlled so that the degree of degassing of the ink, in the ink ejecting section 15, estimated from the detection result by the state detection unit 113 is the predetermined degree of degassing.

For example, when the degree of degassing of the ink, in the ink ejecting sections 15 of all the ink ejecting units 10, estimated from the detection result detected by the state detection unit 113 with the flow rate set to the set flow rate is lower than the predetermined degree of degassing, and the controller 111 controls the feed pump 82 so that the set flow rate is maintained from the detection result, the controller 111 controls the degassing device 100 so that the degree of vacuum of the degassing module 102 is higher than the degree of vacuum of the degassing module 102 when the detection result is detected. In addition, when the degree of degassing of the ink, in the ink ejecting sections 15 of all the ink ejecting units 10, estimated from the detection result detected by the state detection unit 113 with the flow rate set to the set flow rate is lower than the predetermined degree of degassing, and the controller 111 controls the feed pump 82 so that the flow rate is higher than the set flow rate from the detection result, the controller 111 controls the degassing device 100 so that the degree of vacuum of the degassing module 102 is higher than the degree of vacuum of the degassing module 102 when the detection result is detected.

In addition, when the degree of degassing of the ink, in the ink ejecting sections 15 of all the ink ejecting units 10, estimated from the detection result detected by the state detection unit 113 with the flow rate set to the set flow rate is smaller than the predetermined degree of degassing, and the controller 111 controls the feed pump 82 so that the flow rate is lower than the set flow rate from the detection result, the controller 111 controls the degassing device 100 so that the degree of vacuum of the degassing module 102 when the detection result is detected is maintained.

Also, considering the detection history related to the detection result, when the degree of degassing of the ink, in the ink ejecting section 15, estimated from the detection result this time is lower than the predetermined degree of degassing, and there is a previous detection history in which the degree of degassing of the ink in the ink ejecting section 15 is lower than the predetermined degree of degassing, the degassing device 100 is driven and controlled so that the degree of vacuum of the degassing module 102 is higher than the degree of vacuum of the degassing module 102 when the detection result is detected, and when the degree of degassing of the ink, in the ink ejecting section 15, estimated from the current detection result is lower than the predetermined degree of degassing, and there is a detection history in which the degree of degassing of the ink in the ink ejecting section 15 is equal to or higher than the predetermined degree of degassing, the flow rate of the feed pump 82 may be set to smaller than the set flow rate when the detection result is detected. For example, when the viscosity of the ink, in the ink ejecting sections 15 of all the ink ejecting units 10, estimated from the detection result detected by the state detection unit 113 with the flow rate set to the set flow rate is higher than the predetermined viscosity, and an ink ejecting unit 10 in which the degree of degassing of the ink, in the ink ejecting section 15, estimated from the current detection result is lower than the predetermined degree of degassing, and that has a detection history in which the degree of degassing of the ink, in the ink ejecting section 15, estimated from the previous detection result is equal to or higher than the predetermined degree of degassing is present, the controller 111 controls the warming device 900 so that the flow rate of the feed pump 82 of the ink ejecting unit 10 is smaller than the set flow rate when the detection result is detected, and the temperature of the ink in the temperature control module 904 is higher than the temperature of the ink, in the temperature control module 904, when the detection result is detected.

For example, among the plurality of nozzles 24 in the ink ejecting section 15 during the printing process, a non-ejection nozzle that does not eject the ink because it is not used for printing and an ejection nozzle that ejects the ink because it is used for printing ejects may appear. In this case, in the ejection nozzle and the individual liquid chamber 86 communicating with the ejection nozzle, the ink is ejected from the nozzle 24, so that the air bubbles are not likely to generate and the air bubbles are not likely to grow in the ink, and the ink is not likely to thicken. In the non-ejection nozzle and the individual liquid chamber 86 communicating with the non-ejection nozzle, the ink is not ejected from the nozzle 24, so that the ink is stagnant. Therefore, in the individual liquid chamber 86 communicating with the non-ejection nozzle, the air bubbles are likely to generate and the air bubbles are likely to grow in the ink as compared with the individual liquid chamber 86 communicating with the ejection nozzle, and the ink is likely to thicken. When among the plurality of nozzles 24, there are a non-ejection nozzle that does not eject the ink and an ejection nozzle that ejects the ink, the controller 111 may cause the state detection unit 113 to detect a state of the individual liquid chamber 86 that communicates with the non-ejection nozzle.

Next, the maintenance method of the printer 1 will be described. The maintenance process routine in the printer 1 maintenance method shown in FIG. 6 may be executed when the printer 1 is started, or may be repeated at predetermined intervals while the printer 1 is performing the print process.

At the initial execution of the maintenance process routine, the controller 111 sets the set flow rate when controlling the feed pump 82 to a reference flow rate. The reference flow rate is stored in the memory 117 of the controller 111. In the present embodiment, the reference flow rate when controlling the feed pump 82 is the lower limit flow rate at the time of printing. Further, the controller 111 sets the set temperature of the ink in the temperature control module 904 when controlling the warming device 900 to a reference temperature. The reference temperature is stored in the memory 117 of the controller 111. In the present embodiment, the reference temperature of the ink in the temperature control module 904 is the lower limit temperature of the ink in the ink ejecting section 15 at the time of printing. Further, the controller 111 sets the set degree of vacuum of the degassing module 102 when controlling the degassing device 100 to a reference degree of vacuum. The reference degree of vacuum is stored in the memory 117 of the controller 111. In the present embodiment, the reference degree of vacuum of the degassing module 102 when controlling the degassing device 100 is the lower limit degree of vacuum. Further, when necessary, the controller 111 sets the individual liquid chamber 86 to be detected by the state detection unit 113 to the individual liquid chamber 86 that communicates with the non-ejection nozzle when there is a non-ejection nozzle, and to the individual liquid chamber 86 that communicates with the ejection nozzle when there is no non-ejection nozzle. The above-mentioned settings of the set flow rate, the set temperature, and the set degree of vacuum together with the set time as a setting history are stored in the memory 117 of the controller 111.

The controller 111 drives each mechanism based on a set value which is set. That is, the controller 111 controls the feed pump 82 to adjust the flow rate of the ink in the ink circulation path 80 to the set flow rate. Further, the controller 111 controls the warming device 900 to adjust the temperature of the ink in the temperature control module 904 to the set temperature. Further, the controller 111 controls the degassing device 100 to adjust the degree of vacuum of the degassing module 102 to the set degree of vacuum.

Figure 6:
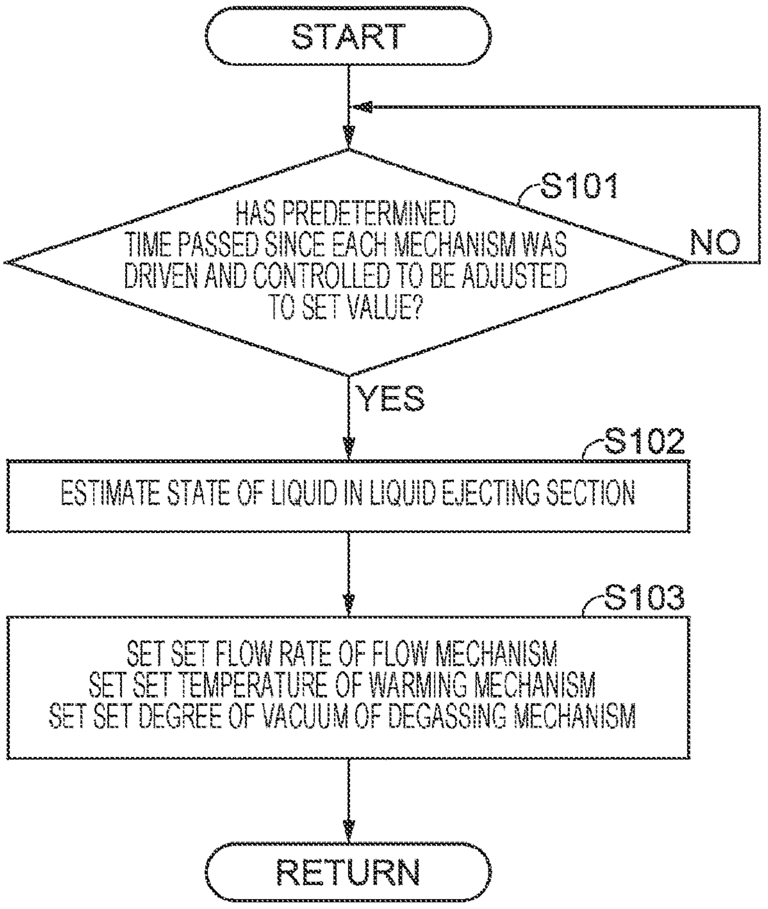
FIG. 6 is a flowchart showing a method of maintaining the liquid ejecting apparatus.

As shown in FIG. 6, in step S101, the controller 111 controls respective mechanisms to adjust them to respective set values, and then determines whether a predetermined time has elapsed. In step S101, when respective mechanisms are driven and controlled to adjust them to respective set values, and then the predetermined time elapses, step S101 is YES. The controller 111 advances the process to step S102. When respective mechanisms are driven and controlled to adjust them to respective set values, and then the predetermined time does not elapse, step S101 is NO, and the controller 111 executes step S101 again. The controller 111 repeatedly executes step S101 until step S101 is YES.

In step S102, the controller 111 estimates the viscosity and degree of degassing of the ink in the individual liquid chamber 86 as the state of the ink in the ink ejecting section 15 from the detection result detected by the state detection unit 113 of each of the five ink ejecting units 10.

In step S103, with respect to each ink ejecting unit 10, based on the difference between the viscosity of the ink, in each individual liquid chamber 86, estimated from the detection result and the predetermined viscosity, the difference between the degree of degassing of the ink and the predetermined degree of degassing, the set flow rate of the feed pump 82 when the detection result is detected, the temperature of the ink in the temperature control module 904, the degree of vacuum of the degassing module 102, and the amount of adjustment of each setting obtained from the detection history regarding the detection result stored in the memory 117 of the controller 111, the controller 111 sets the flow rate of the feed pump 82, sets the temperature of the ink, in the temperature control module 904, when controlling the warming device 900, and sets the degree of vacuum of the degassing module 102 when controlling the degassing device 100. The amount of adjustment of each setting is obtained in advance from the experimental result and is stored in the memory 117 of the controller 111.

For example, when an ink ejecting unit 10 is present in which the viscosity of the ink, in the ink ejecting section 15, estimated from the detection result is lower than a predetermined viscosity, the controller 111 sets the flow rate of the feed pump 82 in the ink ejecting unit 10 to smaller than the set flow rate when the detection result is detected within the range where the flow rate is not smaller than the lower limit flow rate.

Further, for example, when an ink ejecting unit 10 is present in which the viscosity of the ink, in the ink ejecting section 15, estimated from the detection result is a predetermined viscosity, the controller 111 maintains the setting of the flow rate of the feed pump 82 in the ink ejecting unit 10 at the set flow rate when the detection result is detected.

Further, for example, when an ink ejecting unit 10 is present in which the viscosity of the ink, in the ink ejecting section 15, estimated from the detection result is higher than a predetermined viscosity and the set flow rate when the detection result is detected is smaller than the upper limit flow rate, the controller 111 sets the flow rate of the feed pump 82 in the ink ejecting unit 10 to larger than the set flow rate when the detection result is detected within a range not exceeding the upper limit flow rate.

Further, for example, when the viscosity of the ink, in the ink ejecting sections 15 of all the ink ejecting units 10, estimated from the detection result is lower than the predetermined viscosity, and the set flow rate of the feed pump 82 when the detection result is detected is the lower limit flow rate, the controller 111 sets the temperature of the ink, in the temperature control module 904, when controlling the warming device 900 to lower than the set temperature of the ink, in the temperature control module 904, when the detection result is detected.

Further, for example, when the viscosity of the ink, in the ink ejecting sections 15 of all the ink ejecting units 10, estimated from the detection result is higher than the predetermined viscosity, and the set flow rate of the feed pump 82 when the detection result is detected is the upper limit flow rate, the controller 111 sets the temperature of the ink, in the temperature control module 904, when controlling the warming device 900 to higher than the set temperature of the ink, in the temperature control module 904, when the detection result is detected. Further, for example, when it is estimated that the viscosity of the ink, in the ink ejecting sections 15 of all the ink ejecting units 10, estimated from the detection result detected by the state detection unit 113 is higher than the predetermined viscosity, and the viscosity of the ink is lower than the predetermined viscosity when the temperature of the ink in the temperature control module 904 is increased, the controller 111 may set the flow rate of the feed pump 82 to smaller than the set flow rate when the detection result is detected, and may set the temperature of the ink in the temperature control module 904 to higher than the temperature of the ink, in the temperature control module 904, when the detection result is detected.

Also, for example, when the viscosity of the ink, in the ink ejecting sections 15 of all the ink ejecting units 10, estimated from the detection result detected by the state detection unit 113 with the flow rate set to the set flow rate is higher than the predetermined viscosity, and an ink ejecting unit 10 in which the degree of degassing of the ink, in the ink ejecting section 15, estimated from the current detection result is lower than the predetermined degree of degassing, and that has a detection history in which the degree of degassing of the ink, in the ink ejecting section 15, estimated from the previous detection result is equal to or higher than the predetermined degree of degassing is present, the controller 111 sets the flow rate of the feed pump 82 of the ink ejecting unit 10 to smaller than the set flow rate when the current detection result is detected, and sets the temperature of the ink in the temperature control module 904 to higher than the set temperature of the ink, in the temperature control module 904, when the current detection result is detected.

Further, for example, when an ink ejecting unit 10 is present in which the viscosity of the ink, in the ink ejecting section 15, estimated from the detection result detected by the state detection unit 113 with the flow rate set to the set flow rate is higher than a predetermined viscosity, and the degree of degassing of the ink, in the ink ejecting sections 15 of all the ink ejecting units 10, estimated from the detection result is lower than the predetermined degree of degassing, the controller 111 sets the flow rate of the feed pump 82 in the ink ejecting unit 10 to larger than the set flow rate when the detection result is detected, and sets the degree of vacuum of the degassing module 102 when controlling the degassing device 100 to higher than the set degree of vacuum of the degassing module 102 when the detection result is detected.

Further, for example, when the degree of degassing of the ink, in the ink ejecting sections 15 of all the ink ejecting units 10, estimated from the detection result detected by the state detection unit 113 with the flow rate set to the set flow rate is lower than the predetermined degree of degassing, and the setting of the flow rate is maintained at the set flow rate from the detection result, the controller 111 sets the degree of vacuum of the degassing module 102 when controlling the degassing device 100 to higher than the set degree of vacuum of the degassing module 102 when the detection result is detected. Further, when the degree of degassing of the ink, in the ink ejecting sections 15 of all the ink ejecting units 10, estimated from the detection result detected by the state detection unit 113 with the flow rate set to the set flow rate is lower than the predetermined degree of degassing, and the flow rate is set to larger than the set flow rate from the detection result, the controller 111 sets the degree of vacuum of the degassing module 102 when controlling the degassing device 100 to higher than the set degree of vacuum of the degassing module 102 when the detection result is detected.

Further, when the degree of degassing of the ink, in the ink ejecting sections 15 of all the ink ejecting units 10, estimated from the detection result detected by the state detection unit 113 with the flow rate set to the set flow rate is lower than the predetermined degree of degassing, and the flow rate is set to smaller than the set flow rate from the detection result, the controller 111 maintains the setting of the degree of vacuum of the degassing module 102 when controlling the degassing device 100 at the set degree of vacuum of the degassing module 102 when the detection result is detected.

The controller 111 controls each mechanism so as to have the set value set. When the controller 111 executes the process of step S103, the maintenance process routine is terminated.

The controller 111 adjusts the viscosity of the ink in the ink ejecting section 15 to a predetermined viscosity by executing the maintenance process routine shown in FIG. 6. Further, the controller 111 adjusts the degree of degassing of the ink in the ink ejecting section 15 to a predetermined degree of degassing by executing the maintenance process routine shown in FIG. 6.

For example, when an ink ejecting unit 10 is present in which the viscosity of the ink, in the ink ejecting section 15, estimated from the detection result is lower than a predetermined viscosity, the controller 111 sets the flow rate of the feed pump 82 in the ink ejecting unit 10 to smaller than the set flow rate when the detection result is detected within the range where the flow rate is not smaller than the lower limit flow rate.

Further, for example, when an ink ejecting unit 10 is present in which the viscosity of the ink, in the ink ejecting section 15, estimated from the detection result is a predetermined viscosity, the controller 111 maintains the setting of the flow rate of the feed pump 82 in the ink ejecting unit 10 at the set flow rate when the detection result is detected.

Further, for example, when an ink ejecting unit 10 is present in which the viscosity of the ink, in the ink ejecting section 15, estimated from the detection result is higher than a predetermined viscosity and the set flow rate when the detection result is detected is smaller than the upper limit flow rate, the controller 111 sets the flow rate of the feed pump 82 in the ink ejecting unit 10 to larger than the set flow rate when the detection result is detected.

Further, for example, when the viscosity of the ink, in the ink ejecting sections 15 of all the ink ejecting units 10, estimated from the detection result is lower than the predetermined viscosity, and the set flow rate of the feed pump 82 when the detection result is detected is the lower limit flow rate, the controller 111 sets the temperature of the ink in the temperature control module 904 to lower than the temperature of the ink in the temperature control module 904 when the detection result is detected.

Further, for example, when the viscosity of the ink, in the ink ejecting sections 15 of all the ink ejecting units 10, estimated from the detection result is higher than the predetermined viscosity, and the set flow rate of the feed pump 82 when the detection result is detected is the upper limit flow rate, the controller 111 sets the temperature of the ink in the temperature control module 904 to higher than the temperature of the ink in the temperature control module 904 when the detection result is detected. Further, for example, when it is estimated that the viscosity of the ink, in the ink ejecting sections 15 of all the ink ejecting units 10, estimated from the detection result detected by the state detection unit 113 is higher than the predetermined viscosity, and the viscosity of the ink is lower than the predetermined viscosity when the temperature of the ink in the temperature control module 904 is increased, the controller 111 may set the flow rate of the feed pump 82 to smaller than the set flow rate when the detection result is detected, and may control the warming device 900 so that the temperature of the ink in the temperature control module 904 is higher than the temperature of the ink, in the temperature control module 904, when the detection result is detected.

Further, for example, when an ink ejecting unit 10 is present in which the viscosity of the ink, in the ink ejecting section 15, estimated from the detection result detected by the state detection unit 113 with the flow rate set to the set flow rate is higher than a predetermined viscosity, and the degree of degassing of the ink, in the ink ejecting sections 15 of all the ink ejecting units 10, estimated from the detection result is lower than the predetermined degree of degassing, the controller 111 sets the flow rate of the feed pump 82 in the ink ejecting unit 10 to larger than the set flow rate when the detection result is detected, and sets the degree of vacuum of the degassing module 102 to higher than the degree of vacuum of the degassing module 102 when the detection result is detected.

Also, for example, when the degree of degassing of the ink, in the ink ejecting sections 15 of all the ink ejecting units 10, estimated from the detection result detected by the state detection unit 113 with the flow rate set to the set flow rate is lower than the predetermined degree of degassing, and the setting of the flow rate is maintained at the set flow rate from the detection result, the controller 111 sets the degree of vacuum of the degassing module 102 to higher than the degree of vacuum of the degassing module 102 when the detection result is detected. Also, for example, when the degree of degassing of the ink, in the ink ejecting sections 15 of all the ink ejecting units 10, estimated from the detection result detected by the state detection unit 113 with the flow rate set to the set flow rate is lower than the predetermined degree of degassing, and the flow rate is set to larger than the set flow rate from the detection result, the controller 111 sets the degree of vacuum of the degassing module 102 to higher than the degree of vacuum of the degassing module 102 when the detection result is detected.

Further, when the degree of degassing of the ink, in the ink ejecting sections 15 of all the ink ejecting units 10, estimated from the detection result detected by the state detection unit 113 with the flow rate set to the set flow rate is lower than the predetermined degree of degassing, and the flow rate is set to smaller than the set flow rate from the detection result, the controller 111 maintains the setting of the degree of vacuum of the degassing module 102 when controlling the degassing device 100 at the degree of vacuum of the degassing module 102 when the detection result is detected.

Also, for example, when the viscosity of the ink, in the ink ejecting sections 15 of all the ink ejecting units 10, estimated from the detection result detected by the state detection unit 113 with the flow rate set to the set flow rate is higher than the predetermined viscosity, and an ink ejecting unit 10 in which the degree of degassing of the ink, in the ink ejecting section 15, estimated from the current detection result is lower than the predetermined degree of degassing, and that has a detection history in which the degree of degassing of the ink, in the ink ejecting section 15, estimated from the previous detection result is equal to or higher than the predetermined degree of degassing is present, the controller 111 sets the flow rate of the feed pump 82 of the ink ejecting unit 10 to smaller than the set flow rate when the current detection result is detected, and sets the temperature of the ink in the temperature control module 904 to higher than the temperature of the ink in the temperature control module 904 when the current detection result is detected.

Further, the controller 111 adjusts the viscosity of the ink in the ink ejecting section 15 of each of the five ink ejecting units 10 by collectively heating and adjusting the ink in the ink circulation path 80 of each of the five ink ejecting units 10, and by adjusting the flow rate of the ink in the ink circulation path 80 of each of the five ink ejecting units 10.

As described above, according to the first embodiment, the following effects can be obtained. The printer 1 includes the ink ejecting section 15 that ejects the ink from the nozzle 24, the ink flow path 51 capable of supplying the ink to the ink ejecting section 15, the ink return path 57 together with the ink flow path 51 forming the ink circulation path 80 so that the ink supplied to the ink ejecting section 15 can be returned, the warming device 900 that includes the temperature control module 904 provided in the ink circulation path 80, and that can heat the ink in the temperature control module 904, the feed pump 82 capable of flowing the ink in the ink circulation path 80, the state detection unit 113 capable of detecting the state of the ink in the ink ejecting section 15, and the controller 111, wherein the controller 111 controls the feed pump 82 based on the viscosity of the ink, in the ink ejecting section 15, estimated from the detection result detected by the state detection unit 113 to adjust the flow rate of the ink, in the ink circulation path 80, heated by the warming device 900 to adjust the viscosity of the ink in the ink ejecting section 15 to a predetermined viscosity.

According to this, the viscosity of the ink is adjusted by causing the feed pump 82 to adjust the flow rate of the ink in the ink circulation path 80, so that the frequency of control of the warming device 900 can be reduced.

When the viscosity of the ink, in the ink ejecting section 15, estimated from the detection result detected by the state detection unit 113 with the flow rate set to the set flow rate is higher than the predetermined viscosity, the controller 111 of the printer 1 controls the feed pump 82 so that the flow rate is larger than the set flow rate when the detection result is detected. According to this, the flow rate of the ink in the ink circulation path 80 is adjusted based on the viscosity of the ink in the detected ink ejecting section 15 so that the frequency of control of the warming device 900 can be reduced.

When the viscosity of the ink, in the ink ejecting section 15, estimated from the detection result detected by the state detection unit 113 is higher than the predetermined viscosity and the flow rate is the upper limit flow rate, the controller 111 of the printer 1 controls the warming device 900 so that the temperature of the ink in the temperature control module 904 is higher than the temperature of the ink when the detection result is detected. According to this, the viscosity of the ink can be adjusted by adjusting the flow rate by the feed pump 82 and adjusting the temperature of the ink by the warming device 900.

The printer 1 includes the degassing device 100 that includes the degassing module 102 provided in the ink circulation path 80, and that is capable of degassing the ink by increasing the degree of vacuum of the degassing module 102, and when the viscosity of the ink, in the ink ejecting section 15, estimated from the detection result detected by the state detection unit 113 with the flow rate set to the set flow rate is higher than the predetermined viscosity, and the degree of degassing of the, ink in the ink ejecting section 15, estimated from the detection result is lower than the predetermined degree of degassing, the controller 111 of the printer 1 sets the flow rate to smaller than the set flow rate when the current detection result is detected, and controls the warming device 900 so that the temperature of the ink in the temperature control module 904 is higher than the temperature of the ink when the current detection result is detected. According to this, the degree of degassing of the ink and the viscosity of the ink can be adjusted by adjusting the flow rate by the feed pump 82 and adjusting the temperature of the ink by the warming device 900.

The printer 1 includes the degassing device 100 that includes the degassing module 102 provided in the ink circulation path 80, and that is capable of degassing the ink by increasing the degree of vacuum of the degassing module 102, and when the viscosity of the ink, in the ink ejecting section 15, estimated from the detection result detected by the state detection unit 113 with the flow rate set to the set flow rate is higher than the predetermined viscosity, and the degree of degassing of the, ink in the ink ejecting section 15, estimated from the detection result is lower than the predetermined degree of degassing, the controller 111 of the printer 1 controls the feed pump 82 so that the flow rate is larger than the set flow rate when the detection result is detected, and controls the degassing device 100 so that the degree of vacuum of the degassing module 102 is higher than the degree of vacuum when the detection result is detected. According to this, the degree of degassing of the ink and the viscosity of the ink can be adjusted by adjusting the flow rate by the feed pump 82 and adjusting the degree of degassing of the ink by the degassing device 100.

The printer 1 includes a plurality of ink ejecting units 10 each of which includes the ink ejecting section 15, the ink circulation path 80, the feed pump 82, and the state detection unit 113, the warming device 900 can collectively heat and adjust the ink in the temperature control module 904 provided in the ink circulation path 80 of each of the plurality of ink ejecting units 10, and the controller 111 controls the corresponding feed pump 82 based on the viscosity of the ink, in the ink ejecting section 15, estimated from the detection result detected by the state detection unit 113 of each of the plurality of ink ejecting units 10. According to this, even when the plurality of ink circulation paths 80 each of which is coupled to the ink ejecting section 15 and the ink ejecting section 15 is provided, the viscosity of each ink can be adjusted without controlling the warming device 900 in a complicated manner.

The ink ejecting section 15 of the printer 1 includes the individual liquid chamber 86 communicating with the nozzle 24 and the ejection element 89, and can drive the ejection element 89 to eject the ink in the individual liquid chamber 86 from the nozzle 24. The state detection unit 113 detects the vibration, of the individual liquid chamber 86, driven by the ejection element 89, thereby detecting the state of the ink in the ink ejecting section 15. According to this, the state in the individual liquid chamber 86 as the state of the ink in the ink ejecting section 15 can be detected by using the ejection element 89 that ejects the ink from the nozzle 24 without separately providing a detection element or the like.

The method of maintaining the printer 1 is a method of maintaining the liquid ejecting apparatus including the ink ejecting section 15 that ejects the ink from the nozzle 24, the ink flow path 51 coupled to the ink ejecting section 15 so that the ink can be supplied to the ink ejecting section 15, the ink return path 57 together with the ink flow path 51 forming the ink circulation path 80 so that the ink supplied to the ink ejecting section 15 can be returned, the warming device 900 that includes the temperature control module 904 provided in the ink circulation path 80 and that can heat the ink in the temperature control module 904, and the feed pump 82 capable of flowing the ink in the ink circulation path 80. The method includes adjusting the viscosity of the ink in the ink ejecting section 15 to a predetermined viscosity by adjusting the flow rate of the ink, in the ink circulation path 80, heated by the warming device 900. According to this, the viscosity of the ink is adjusted by adjusting the flow rate of the ink in the ink circulation path 80, so that the frequency of control of the warming device 900 can be reduced.

The maintenance method of the printer 1 includes, when the viscosity of the ink in the ink ejecting section 15 when the flow rate is set to the set flow rate is higher than the predetermined viscosity, setting the flow rate to larger than the set flow rate. According to this, the frequency of control of the warming device 900 can be reduced by adjusting the flow rate of the ink based on the detected viscosity of the ink in the ink ejecting section 15.

The maintenance method of the printer 1 includes, when the viscosity of the ink in the ink ejecting section 15 when the flow rate is set to the set flow rate is higher than the predetermined viscosity, and the set flow rate is the upper limit flow rate, setting the temperature of the ink in the temperature control module 904 to higher than the temperature of the ink in the temperature control module 904 when the flow rate is set to the set flow rate. According to this, the viscosity of the ink can be adjusted by adjusting the flow rate in the ink circulation path 80 and adjusting the temperature of the ink by the warming device 900.

The printer 1 includes the degassing device 100 that includes the degassing module 102 provided in the ink circulation path 80, and that is capable of degassing the ink by increasing the degree of vacuum of the degassing module 102. The maintenance method of the printer 1 includes, when the viscosity of the ink in the ink ejecting section 15 when the flow rate is set to the set flow rate is higher than the predetermined viscosity, and the degree of degassing of the ink in the ink ejecting section 15 is lower than the predetermined degree of degassing, setting the flow rate to smaller than the set flow rate, and setting the temperature of the ink in the temperature control module 904 to higher than the temperature of the ink in the temperature control module 904 when the flow rate is set to the set flow rate. According to this, the degree of degassing of the ink and the viscosity of the ink can be adjusted by adjusting the flow rate in the ink circulation path 80 and adjusting the temperature of the ink by the warming device 900.

The printer 1 includes the degassing device 100 that includes the degassing module 102 provided in the ink circulation path 80, and that is capable of degassing the ink by increasing the degree of vacuum of the degassing module 102. The maintenance method of printer 1 includes, when the viscosity of the ink in the ink ejecting section 15 when the flow rate is set to the set flow rate is higher than the predetermined viscosity, and the degree of degassing of the ink in the ink ejecting section 15 is lower than the predetermined degree of degassing, setting the flow rate to larger than the set flow rate, and setting the degree of vacuum of the degassing module 102 to higher than the degree of vacuum of the degassing module 102 when the flow rate is set to the set flow rate. According to this, the viscosity of the ink can be adjusted while ensuring the degree of degassing of the ink by adjusting the flow rate in the ink circulation path 80 and adjusting the degree of degassing of the ink by the degassing device 100.

The printer 1 includes a plurality of ink ejecting units 10 each of which includes the ink ejecting section 15, the ink circulation path 80, and the feed pump 82, and adjusts the viscosity of the ink in the ink ejecting sections 15 of each of the plurality of ink ejecting units 10 to the predetermined viscosity by collectively heating and adjusting the ink in the temperature control module 904 provided in the ink circulation path 80 of each of the plurality of ink ejecting units 10, and adjusting the flow rate of the ink in the ink circulation path 80 of each of the plurality of ink ejecting units 10.

According to this, even when the plurality of ink circulation paths 80 each of which is coupled to the ink ejecting section 15 and the ink ejecting section 15 is provided, the viscosity of each ink can be adjusted without controlling the warming device 900 in a complicated manner.

2. Second Embodiment

Figure 7:
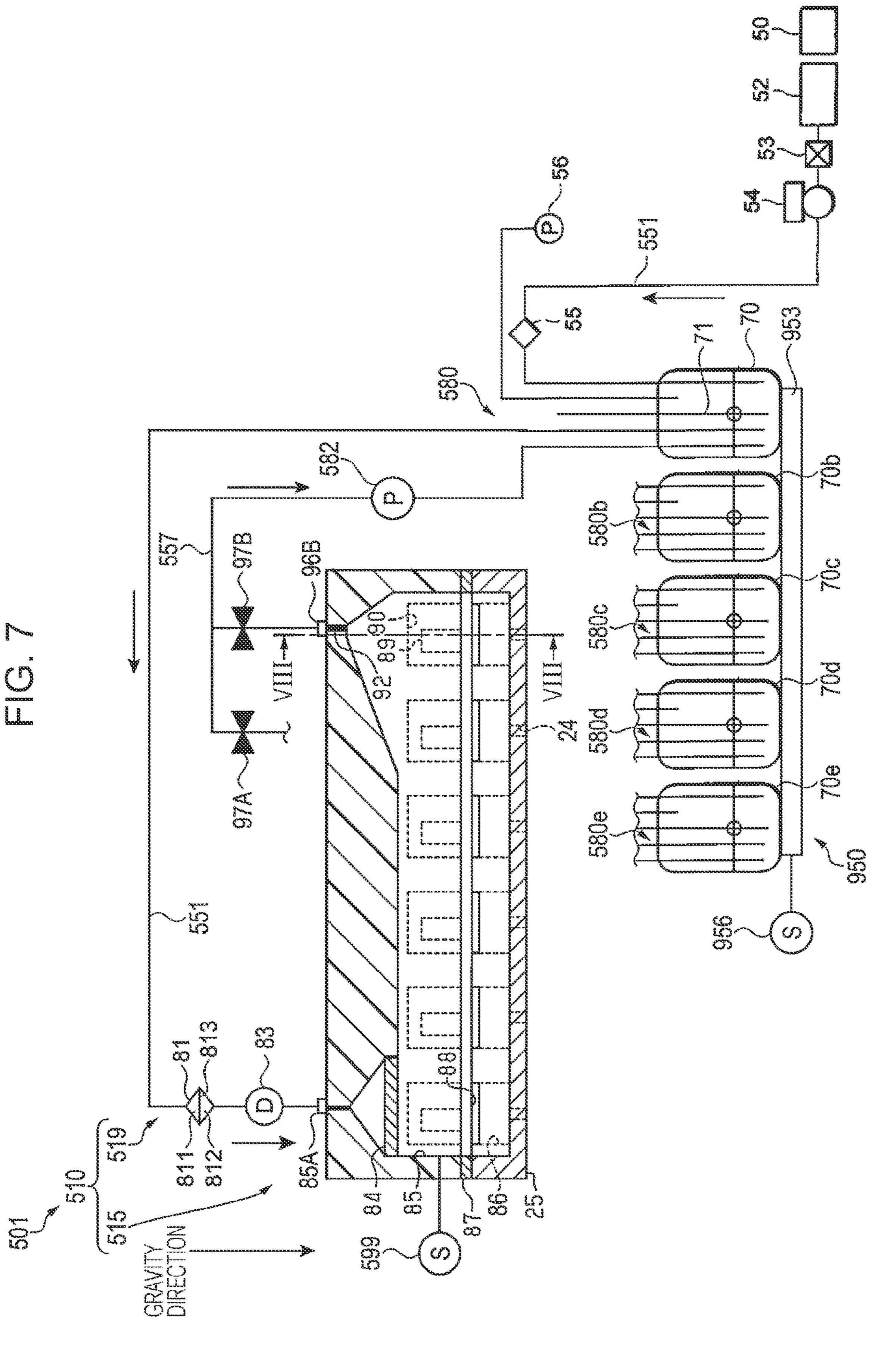
FIG. 7 is an explanatory diagram schematically showing a liquid ejecting unit in a liquid ejecting apparatus according to the second embodiment.

FIG. 7 is an explanatory diagram schematically showing a liquid ejecting unit in a liquid ejecting apparatus according to the second embodiment. An ink ejecting unit 510 of a printer 501 of the present embodiment includes an ink ejecting section 515 and an ink supply unit 519, which correspond to the ink ejecting section 15 and the ink supply unit 19 constituting the ink ejecting unit 10 of the first embodiment are shown in FIG. 7. For the same constituent parts as those in the first embodiment, the same numbers will be used, and duplicate description thereof will be omitted.

Figure 8:
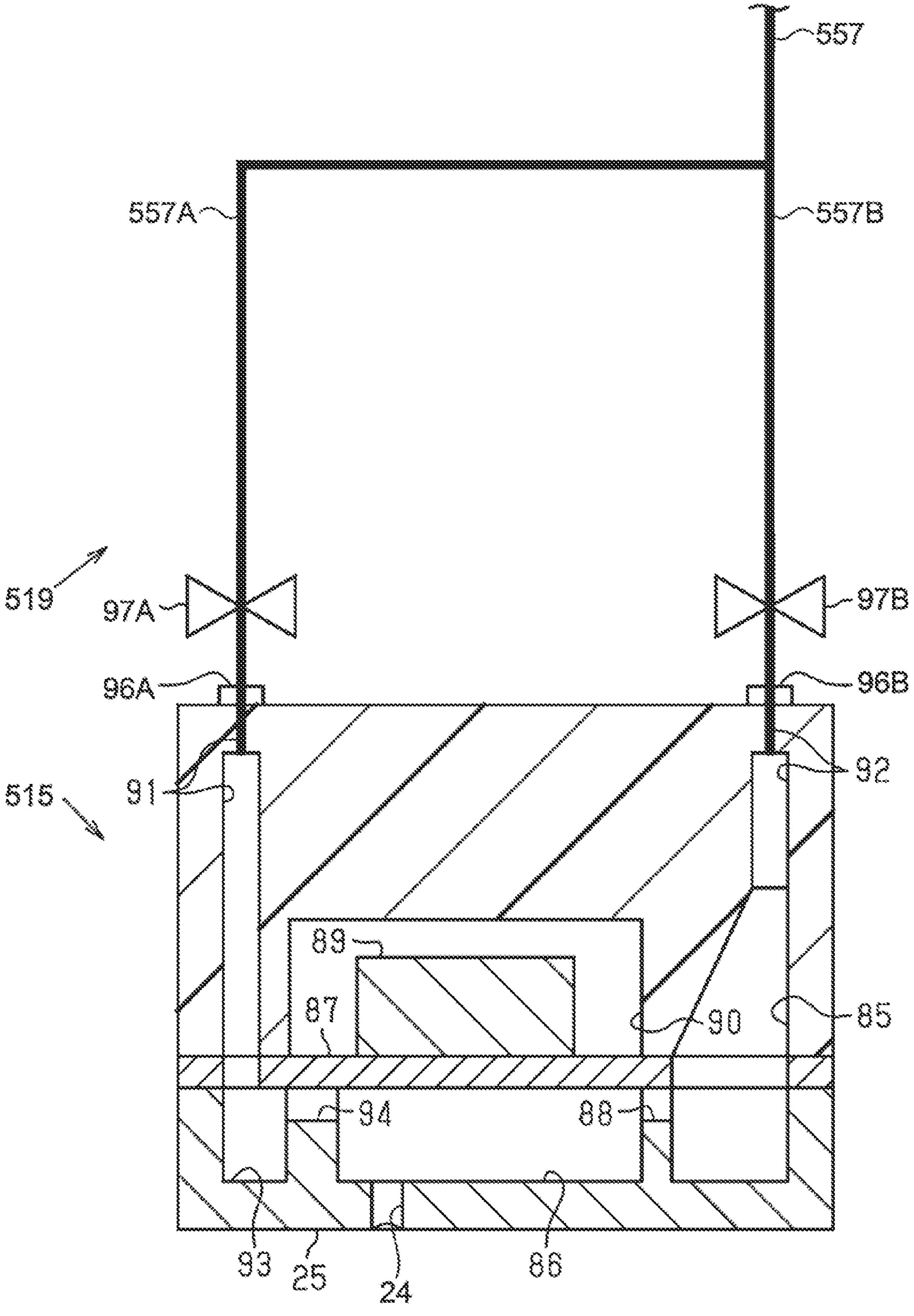
FIG. 8 is a cross-sectional view taken along line VIII-VIII in FIG. 7.

As shown in FIGS. 7 and 8, the ink ejecting section 515 has a discharge liquid chamber side discharge port 96A and the common liquid chamber side discharge port 96B as discharge ports capable of discharging the supplied ink to the outside without the ink passing through the nozzle 24. The ink ejecting section 515 includes a discharge liquid chamber side discharge flow path 91 communicating with the discharge liquid chamber side discharge port 96A, the common liquid chamber side discharge flow path 92 communicating with the common liquid chamber side discharge port 96B, and a discharge liquid chamber 93 that couples the discharge liquid chamber side discharge flow path 91 and the individual liquid chambers 86. As a result, the discharge liquid chamber 93 communicates with the discharge liquid chamber side discharge port 96A via the discharge liquid chamber side discharge flow path 91, and communicates with the supply port 85A via the individual liquid chamber 86 and the common liquid chamber 85. Further, the common liquid chamber 85 communicates with the discharge liquid chamber side discharge port 96A via the individual liquid chamber 86, the discharge liquid chamber 93, and the discharge liquid chamber side discharge flow path 91, and communicates with the common liquid chamber side discharge port 96B via the common liquid chamber side discharge flow path 92. The discharge liquid chamber 93 communicates with the plurality of individual liquid chambers 86 via a discharge side communication passage 94 provided for each individual liquid chamber 86.

As shown in FIG. 7, the ink ejecting section 515 includes an ink temperature sensor 599 as a state detection unit capable of detecting the temperature of the ink in the ink ejecting section 515. The ink temperature sensor 599 of the present embodiment detects the temperature, of the ink in the common liquid chamber 85, as the state of the ink in the ink ejecting section 515. The controller 111 estimates the viscosity of the ink in the ink ejecting section 515 from the relationship between the ink temperature, in the ink ejecting section 515, as a detection result detected by the ink temperature sensor 599, and the ink temperature and the ink viscosity stored in the memory 117.

As shown in FIG. 7, the ink supply unit 519 of the present embodiment includes an ink return path 557 as a return flow path where an ink flow path 551 as a supply flow path and the ink return path 557 form an ink circulation path 580 as a circulation flow path, a feed pump 582 as a flow mechanism, and a warming device 950 as a warming mechanism. The ink supply unit 519 of the present embodiment includes the ink flow path 551, the ink circulation path 580 the ink return path 557, the feed pump 582, and the warming device 950, which correspond to the ink flow path 51, the ink circulation path 80, the ink return path 57, the feed pump 82, and the warming device 900 of the first embodiment, but does not include a unit corresponding to the degassing device 100.

The ink flow path 551 couples the sub tank 70 and the supply port 85A of the ink ejecting section 515 so that the ink stored in the sub tank 70 can be supplied to the ink ejecting section 515. The ink flow path 551 of the present embodiment does not include a unit corresponding to the feed pump 82 as a flow mechanism in the first embodiment. The ink return path 557 together with the ink flow path 551 forms the ink circulation path 580 so that the ink supplied to the ink ejecting section 515 can be returned.

The ink return path 557 includes the feed pump 582 capable of flowing the ink in the ink circulation path 580 in the direction of the arrow shown in FIG. 7. The feed pump 582 is provided at a position between the sub tank 70 in the ink return path 557 and the ink ejecting section 515. The controller 111 adjusts the flow rate of the ink in the ink circulation path 580 by keeping the inside of the sub tank 70 in a sealed state and controlling the feed pump 582.

As shown in FIGS. 7 and 8, the ink return path 557 includes a discharge liquid chamber side return path 557A coupled to the discharge liquid chamber side discharge port 96A and a common liquid chamber side return path 557B coupled to the common liquid chamber side discharge port 96B so that the ink supplied to the ink ejecting section 515 can be returned to the ink flow path 551. The ink return path 557 of the present embodiment is configured so that the discharge liquid chamber side return path 557A and the common liquid chamber side return path 557B merge.

A discharge liquid chamber side return valve 97A is provided in the discharge liquid chamber side return path 557A. A common liquid chamber side return valve 97B is provided in the common liquid chamber side return path 557B. By opening either the discharge liquid chamber side return valve 97A or the common liquid chamber side return valve 97B, the controller 111 can switch between a mode in which the common liquid chamber 85, the individual liquid chamber 86, the discharge liquid chamber 93, and the discharge liquid chamber side discharge flow path 91 of the ink ejecting section 515, and the discharge liquid chamber side return path 557A constitute part of the ink circulation path 580, and a mode in which the common liquid chamber 85 and the common liquid chamber side discharge flow path 92 of the ink ejecting section 515, and the common liquid chamber side return path 557B constitute part of the ink circulation path 580. With part of the ink in the nozzle 24 moved into the individual liquid chamber 86 by opening the discharge liquid chamber side return valve 97A, and controlling the feed pump 582 so that the flow rate of the ink in the ink circulation path 580 is increased, the controller 111 may circulate the ink in the ink circulation path 580 to suppress the thickening of the ink in the nozzle 24.

As shown in FIG. 7, the warming device 950 includes a heater 953 capable of collectively heating the sub tanks 70, 70*b*, 70*c*, 70*d*, and 70*e* provided in the respective ink circulation paths 580, 580*b*, 580*c*, 580*d*, and 580*e* of the five ink ejecting units 510, respectively, and a heater temperature sensor 956 as the detector group 112 capable of detecting the temperature of the heater 953. The sub tanks 70, 70*b*, 70*c*, 70*d*, and 70*e* of the present embodiment function as the temperature control modules 904, 904*b*, 904*c*, 904*d*, and 904*e* in the first embodiment. The controller 111 controls the heater 953 based on the temperature, of the heater 953, detected by the heater temperature sensor 956, and collectively adjusts the temperature of the ink in the five sub tanks 70 to the set temperature.

In the printer 501, when the temperature of the ink in the ink ejecting section 515 is lower than the predetermined temperature, the viscosity of the ink in the ink ejecting section 515 may be higher than the predetermined viscosity, and the ink may not be ejected normally from the nozzle 24. Therefore, the printer 501 is configured to perform a maintenance operation for adjusting the viscosity of the ink. The controller 111 of the embodiment controls, as a maintenance operation for the printer 501, the feed pump 582 to adjust the flow rate of the ink, in the ink circulation path 580, heated in the warming device 950 to adjust the viscosity of the ink, in the ink ejecting section 515, estimated from the detection result detected by the ink temperature sensor 599 to a predetermined viscosity. Further, the controller 111 of the present embodiment controls, as a maintenance operation of the printer 501, the corresponding feed pump 582 based on the viscosity of the ink, in the ink ejecting section 515, estimated from the detection result detected by the ink temperature sensor 599 of each of the plurality of ink ejecting units 510.

For example, when the viscosity of the ink, in the ink ejecting section 515, estimated from the detection result detected by the ink temperature sensor 599 with the flow rate set to the set flow rate is lower than the predetermined viscosity, the controller 111 controls the feed pump 582 so that the flow rate is smaller than the set flow rate. Further, for example, when the viscosity of the ink, in the ink ejecting section 515, estimated from the detection result detected by the ink temperature sensor 599 with the flow rate set to the set flow rate is the predetermined viscosity, the controller 111 controls the feed pump 582 so that the flow rate is maintained. Further, for example, when the viscosity of the ink, in the ink ejecting section 515, estimated from the detection result detected by the ink temperature sensor 599 with the flow rate of the ink in the ink circulation path 580 set to the set flow rate is higher than the predetermined viscosity, the controller 111 controls the feed pump 582 so that the flow rate is larger than the set flow rate.

Further, for example, when the viscosity of the ink, in the ink ejecting section 515, estimated from the detection result detected by the ink temperature sensor 599 is higher than the predetermined viscosity, and the flow rate of the ink in the ink circulation path 580 is the upper limit flow rate, the controller 111 controls the warming device 950 so that the temperature of the ink in the sub tank 70 as the temperature control module is higher than the temperature of the ink, in the sub tank 70, when the detection result is detected.

As described above, according to the second embodiment, the following effects can be obtained. The printer 501 includes the ink ejecting section 515 that ejects the ink from the nozzle 24, the ink flow path 551 capable of supplying the ink to the ink ejecting section 515, the ink return path 557 together with the ink flow path 551 forming the ink circulation path 580 so that the ink supplied to the ink ejecting section 515 can be returned, the warming device 950 that includes the sub tank 70 provided in the ink circulation path 580, and that can heat the ink in the sub tank 70, the feed pump 582 capable of flowing the ink in the ink circulation path 580, the ink temperature sensor 599 capable of detecting the state of the ink in the ink ejecting section 515, and the controller 111, wherein the controller 111 controls the feed pump 582 based on the viscosity of the ink, in the ink ejecting section 515, estimated from the detection result detected by the ink temperature sensor 599 to adjust the flow rate of the ink, in the ink circulation path 580, heated by the warming device 950 to adjust the viscosity of the ink in the ink ejecting section 515 to a predetermined viscosity. According to this, the viscosity of the ink is adjusted by causing the feed pump 582 to adjust the flow rate of the ink in the ink circulation path 580, so that the frequency of control of the warming device 950 can be reduced.

When the viscosity of the ink, in the ink ejecting section 515, estimated from the detection result detected by the ink temperature sensor 599 with the flow rate set to the set flow rate is higher than the predetermined viscosity, the controller 111 of the printer 501 controls the feed pump 582 so that the flow rate is larger than the set flow rate when the detection result is detected. According to this, the flow rate of the ink in the ink circulation path 580 is adjusted based on the viscosity of the ink in the detected ink ejecting section 515 so that the frequency of control of the warming device 950 can be reduced.

When the viscosity of the ink, in the ink ejecting section 515, estimated from the detection result detected by the ink temperature sensor 599 is higher than the predetermined viscosity and the flow rate is the upper limit flow rate, the controller 111 of the printer 501 controls the warming device 950 so that the temperature of the ink in the sub tank 70 is higher than the temperature of the ink when the detection result is detected. According to this, the viscosity of the ink can be adjusted by adjusting the flow rate by the feed pump 582 and adjusting the temperature of the ink by the warming device 950.

The printer 501 includes the plurality of ink ejecting units 510 each of which includes the ink ejecting section 515, the ink circulation path 580, the feed pump 582, and the ink temperature sensor 599, the warming device 950 can collectively heat and adjust the ink in the sub tank 70 provided in the ink circulation path 580 of each of the plurality of ink ejecting units 510, and the controller 111 controls the corresponding feed pump 582 based on the viscosity of the ink, in the ink ejecting section 515, estimated from the detection result detected by the ink temperature sensor 599 of each of the plurality of ink ejecting units 510. According to this, even when the plurality of ink circulation paths 580 each of which is coupled to the ink ejecting section 515 and the plurality of ink ejecting sections 515 are provided, the viscosity of each ink can be adjusted without controlling the warming device 950 in a complicated manner.

The above embodiment and other embodiments described below can be implemented in combination with each other to the extent that they are technically consistent. Hereinafter, other embodiments will be described.

In the first embodiment, the printer 1 may include one ink ejecting unit 10 so as to correspond to one kind of ink.

The reference flow rate set by the controller 111 as the set flow rate when controlling the feed pump 82 at the initial execution of the maintenance process routine in the maintenance method of the printer 1 is an any flow rate between the upper limit flow rate and the lower limit flow rate. Further, the reference temperature set by the controller 111 as the set temperature of the ink in the temperature control module 904 may be an any temperature higher than the lower limit temperature of the ink in the ink ejecting section 15 at the time of printing. Further, the reference degree of vacuum set by the controller 111 as the set degree of vacuum of the degassing module 102 when controlling the degassing device 100 may be an any degree of vacuum lower than the lower limit degree of vacuum.

In step S103 of the maintenance process routine in the maintenance method of the printer 1, the adjustment amount when the controller 111 changes the setting of the flow rate of the feed pump 82, the setting of the temperature of the ink in the temperature control module 904 when controlling the warming device 900, and the setting of the degree of vacuum of the degassing module 102 when controlling the degassing device 100 may be a fixed value set in advance. In this case, the controller 111 adjusts the viscosity of the ink and the degree of degassing of the ink as a liquid state in the ink ejecting section 15 to a predetermined viscosity of the ink and a predetermined degree of degassing of the ink in the ink ejecting section 15 by repeating the adjustment to the set value set by the control of each mechanism, and the estimation of the state of the liquid in the ink ejecting section 15.

In the maintenance method of printer 1, when an ink ejecting unit 10 is present in which even when the temperature of the ink in the temperature control module 904 is set to higher than the set temperature, and the maintenance process of circulating the ink in the ink circulation path 80 is repeated, the viscosity of the ink in the ink ejecting section 15 does not decrease, or the temperature of the ink in the ink ejecting section 15 does not rise, the controller 111 may determine that the filter 813 of the filter unit 81 of the ink ejecting unit is clogged to finish the maintenance process, and may urge the operator of the printer 1 to replace the filter unit 81.

In the first embodiment, when it is estimated that the viscosity of the ink, in the ink ejecting section 15 included in the ink ejecting unit 10, estimated from the detection result detected by the state detection unit 113 is higher than a predetermined viscosity, and the nozzle 24 of the ink ejecting section 15 has a concave meniscus, the controller 111 of the printer 1 may set the flow rate of the feed pump 82 included in the ink ejecting unit 10 to larger than the set flow rate when the detection result is detected, exceeding the upper limit flow rate. In this case, when it is estimated that the meniscus of the nozzle 24, of the ink ejecting section 15 of the ink ejecting unit 10, estimated from the detection result detected next by the state detection unit 113 is broken, the controller 111 may set the flow rate of the feed pump 82 of the ink ejecting unit 10 to the upper limit flow rate, and may control the warming device 900 so that the temperature of the ink in the temperature control module 904 is higher than the temperature of the ink, in the temperature control module 904, when the previous detection result is detected.

In the first embodiment, the controller 111 of the printer 1 may not estimate the degree of degassing of the ink in the ink ejecting section 15 based on the vibration waveform, of the individual liquid chamber 86, which is the detection result detected by the state detection unit 113. In this case, for example, the controller 111 sets, at the initial execution of the maintenance process routine in the maintenance method of the printer 1, the reference degree of vacuum set as the set degree of vacuum of the degassing module 102 to the upper limit degree of vacuum when the degassing module 102 is decompressed with the maximum capacity of the decompression pump 101. Further, in this case, the controller 111 may not estimate the degree of degassing of the ink and may not set the set degree of vacuum of the degassing mechanism in the ink ejecting section 15 in the maintenance process routine in the maintenance method of the printer 1.

In the first embodiment, the ink ejecting section 15 of the printer 1 may be provided with an ink temperature sensor as a state detection unit capable of detecting the temperature of the ink in the ink ejecting section 15. The controller 111 may estimate the viscosity of the ink in the ink ejecting section 15 based on the temperature of the ink, in the ink ejecting section 15, which is the detection result detected by the ink temperature sensor as the state detection unit.

In the first embodiment, the ink ejecting section 15 of the printer 1 may be provided with a degree of degassing sensor as a state detection unit capable of measuring the amount of dissolved oxygen in the ink in the ink ejecting section 15. The controller 111 may estimate the degree of degassing of the ink in the ink ejecting section 15 based on the amount of dissolved oxygen in the ink, in the ink ejecting section 15, which is the detection result detected by the degree of degassing sensor as the state detection unit.

In the first embodiment, the controller 111 of the printer 1 may store the history of the amount of ink ejected by the nozzle 24 in the memory 117. In this case, when among the nozzles 24, there is a nozzle 24 in which the amount of ink ejected is an amount corresponding less than a predetermined number of times and a nozzle 24 in which the amount of ink ejected is an amount corresponding more than the predetermined number of times, the state detection unit 113 may perform detection on the individual liquid chamber 86 communicating with the nozzle 24 in which the amount of ink ejected is an amount corresponding to less than the predetermined number of times.

In the first embodiment, when the ink is flowed in the ink circulation path 80, the controller 111 of the printer 1 may cause the state detection unit 113 to perform detection on the individual liquid chambers 86 communicating with a region where the ink is difficult to flow in the common liquid chamber 85 of the ink ejecting section 15, for example, the individual liquid chamber 86 at the right end in FIG. 2.

In the first embodiment, the controller 111 of the printer 1 may cause the state detection unit 113 to perform on the plurality of individual liquid chambers 86 without distinguishing an individual liquid chamber 86 communicating with the non-ejection nozzle from an individual liquid chamber 86 communicating with the ejection nozzle.

In the first embodiment, the ink ejecting section 15 of the printer 1 may not include the common liquid chamber side discharge port 96B. In this case, for example, the ink return path 57 may couple a portion between the ink ejecting section 15 and the damper unit 83 in the ink flow path 51 and the sub tank 70 so that the ink supplied to the ink ejecting section 15 can be returned.

In the first embodiment, the degassing module 102 included in the degassing device 100 of the printer 1 may be provided in the ink return path 57.

In the second embodiment, the degassed ink is stored in the ink cartridge 50, and the controller 111 may control the supply pump 54 and the feed pump 582 to supply the degassed ink to the sub tank 70, and may adjust the amount of dissolved oxygen in the ink circulating in the ink circulation path 580 to be within a predetermined range to supply the ink whose amount of dissolved oxygen is adjusted to a predetermined range to the ink ejecting section 515.

The liquid ejecting apparatus may include a carriage on which the liquid ejecting section is mounted, and may eject the liquid from the liquid ejecting section mounted on the carriage that moves along the printing paper as a medium to print an image on the printing paper. In this case, for example, in the second embodiment, the sub tank 70, the filter unit 81, the damper unit 83, the ink ejecting section 515, the feed pump 582, and the warming device 950 that constitute the ink circulation path 580 of the ink ejecting unit 510 may be mounted on the carriage.

In the second embodiment, the damper unit 83 of the printer 501 may be a pressure reducing valve having a damper function capable of absorbing pressure fluctuations of the supplied ink.

The liquid ejecting apparatus may include an electric heat conversion element such as a heater capable of heating the liquid in the individual liquid chamber as the ejection element included in the liquid ejecting section. For example, in the first embodiment, the controller 111 of the printer 1 may drive the heater as the ejection element 89 of the ink ejecting section 15 to heat the ink in the individual liquid chamber 86 to cause the film boiling, and may cause the nozzle 24 to eject the ink. In this case, the state detection unit may compare the maximum temperature, at the time of ink ejection, detected by the temperature detection element as the detector group 112 directly provided under the heater with a predetermined threshold value, or calculate the difference in temperature change to estimate the state inside the individual liquid chamber 86. Further, a flying object detector, using an optical element, as the detector group 112 may be further provided, and the state detection unit may detect the ejection state by using the flying object detector. The controller 111 may estimate the ink state of the ink ejecting section 15 by combining the state detection in the individual liquid chamber 86 and the detection result by the flying object detector using the optical element.

What is claimed is:

1. A liquid ejecting apparatus comprising:

a liquid ejecting section that ejects a liquid from a nozzle;

a circulation flow path including a supply flow path through which the liquid is supplied to the liquid ejecting section and a return flow path through which the liquid supplied to the liquid ejecting section is returned;

a warming mechanism including a temperature control module provided in the circulation flow path, the warming mechanism being configured to heat the liquid in the temperature control module;

a flow mechanism that flows the liquid in the circulation flow path;

a state detection unit that detects a state of the liquid in the liquid ejecting section; and a controller, wherein the controller executes a first control that sets a temperature of the liquid in the temperature control module to a set temperature by controlling the warming mechanism and controls the flow mechanism to circulate the liquid in the circulation flow path at a set flow rate, the controller estimates a viscosity of the liquid in the liquid ejecting section from a detection result detected by the state detection unit when a predetermined time has elapsed during the execution of the first control, and the controller executes a second control that maintains the set temperature and controls the flow mechanism to circulate the liquid in the circulation flow path by changing the flow rate from the set flow rate to a flow rate corresponding to the estimated viscosity of the liquid.

2. The liquid ejecting apparatus according to claim 1, wherein when a viscosity of the liquid estimated is higher than a predetermined viscosity, the controller controls the flow mechanism so that the flow rate is larger than the set flow rate.

3. The liquid ejecting apparatus according to claim 1, wherein when a viscosity of the liquid, in the liquid ejecting section, estimated from the detection result detected by the state detection unit is higher than a predetermined viscosity and the flow rate is an upper limit flow rate, the controller controls the warming mechanism so that a temperature of the liquid in the temperature control module is higher than a temperature of the liquid at a time of the detection result is detected by the state detection.

4. The liquid ejecting apparatus according to claim 1, further comprising:

a degassing mechanism including a degassing module provided in the circulation flow path, the degassing mechanism degassing the liquid by increasing a degree of vacuum of the degassing module, wherein when a viscosity of the liquid, in the liquid ejecting section, estimated from a detection result detected by the state detection unit when the flow rate is a set flow rate is higher than a predetermined viscosity, and a degree of degassing of the liquid, in the liquid ejecting section, estimated from the detection result is lower than a predetermined degree of degassing, the controller controls the warming mechanism so that the flow rate is smaller than the set flow rate at a time of the detection result is detected by the state detection, and a temperature of the liquid in the temperature control module is higher than a temperature of the liquid at the time of the detection result is detected by the state detection.

5. The liquid ejecting apparatus according to claim 1, further comprising:

a degassing mechanism including a degassing module provided in the circulation flow path, the degassing mechanism degassing the liquid by increasing a degree of vacuum of the degassing module, wherein when a viscosity of the liquid, in the liquid ejecting section, estimated from the detection result detected by the state detection unit when the flow rate is a set flow rate is higher than a predetermined viscosity, and a degree of degassing of the liquid, in the liquid ejecting section, estimated from the detection result is lower than a predetermined degree of degassing, the controller controls the flow mechanism so that the flow rate is larger than the set flow rate at a time of the detection result is detected by the state detection, and controls the degassing mechanism so that a degree of vacuum of the degassing module is higher than a degree of vacuum at the time of the detection result is detected by the state detection.

6. The liquid ejecting apparatus according to claim 1, wherein the liquid ejecting apparatus includes a plurality of liquid ejecting units each of which includes the liquid ejecting section, the circulation flow path, the flow mechanism, and the state detection unit, wherein the warming mechanism collectively heats the liquid in the temperature control module provided in the circulation flow paths of each of the plurality of liquid ejecting units, and wherein the controller controls the corresponding flow mechanism based on a viscosity of the liquid, in the liquid ejecting section, estimated from a detection result detected by the state detection unit of each of the plurality of liquid ejecting units.

7. The liquid ejecting apparatus according to claim 1, wherein the liquid ejecting section includes an individual liquid chamber communicating with the nozzle and an ejection element, and drives the ejection element to eject the liquid in the individual liquid chamber from the nozzle, and wherein the state detection unit detects a state of the liquid in the liquid ejecting section by detecting a vibration, of the individual liquid chamber, driven by the ejection element.

8. The liquid ejecting apparatus according to claim 1, wherein in the second control, the controller controls the flow mechanism to circulate at the flow rate within a range where the flow rate is not smaller than a lower limit flow rate.

9. A method of maintaining a liquid ejecting apparatus including a liquid ejecting section that ejects a liquid from a nozzle, a circulation flow path including a supply flow path through which the liquid is supplied to the liquid ejecting section and a return flow path through which the liquid supplied to the liquid ejecting section is returned, a warming mechanism including a temperature control module provided in the circulation flow path, the warming mechanism being configured to heat the liquid in the temperature control module, a state detection unit that detects a state of the liquid ejecting section, the method comprising:

executing a first control that sets a temperature of the liquid in the temperature control module to a set temperature by controlling the warming mechanism and controls a flow mechanism to circulate the liquid in the circulation flow path at a set flow rate, estimating a viscosity of the liquid in the liquid ejecting section from a detection result detected by the state detection unit when a predetermined time has elapsed during the execution of the first control, and executing a second control that maintain the set temperature and controls the flow mechanism to circulate the liquid in the circulation flow path by changing the flow rate from the set flow rate to a flow rate corresponding to the estimated viscosity of the liquid.

10. The method of maintaining the liquid ejecting apparatus according to claim 9, wherein when a viscosity of the liquid estimated is higher than a predetermined viscosity, the method includes setting the flow rate to higher than the set flow rate.

11. The method of maintaining the liquid ejecting apparatus according to claim 9, wherein when a viscosity of the liquid in the liquid ejecting section when the flow rate is set to a set flow rate is higher than a predetermined viscosity, and the set flow rate is an upper limit flow rate, the method includes setting a temperature of the liquid in the temperature control module to higher than a temperature of the liquid when the flow rate is set to the set flow rate.

12. The method of maintaining the liquid ejecting apparatus according to claim 9, wherein the liquid ejecting apparatus further includes a degassing mechanism including a degassing module provided in the circulation flow path, the degassing mechanism degassing the liquid by increasing a degree of vacuum of the degassing module, and wherein when a viscosity of the liquid in the liquid ejecting section when the flow rate is set to a set flow rate is higher than a predetermined viscosity, and a degree of degassing of the liquid in the liquid ejecting section is lower than a predetermined degree of degassing, the method includes setting the flow rate to smaller than the set flow rate, and setting a temperature of the liquid in the temperature control module to higher than a temperature of the liquid when the flow rate is set to the set flow rate.

13. The method of maintaining the liquid ejecting apparatus according to claim 9, wherein the liquid ejecting apparatus further includes a degassing mechanism including a degassing module provided in the circulation flow path, the degassing mechanism degassing the liquid by increasing a degree of vacuum of the degassing module, and wherein when a viscosity of the liquid in the liquid ejecting section when the flow rate is set to a set flow rate is higher than a predetermined viscosity, and a degree of degassing of the liquid in the liquid ejecting section is lower than a predetermined degree of degassing, the method includes setting the flow rate to larger than the set flow rate, and setting a degree of vacuum of the degassing module to higher than a degree of vacuum when the flow rate is set to the set flow rate.

14. The method of maintaining the liquid ejecting apparatus according to claim 9, wherein the liquid ejecting apparatus includes a plurality of liquid ejecting units each of which includes the liquid ejecting section, the circulation flow path, and the flow mechanism, and wherein the method includes collectively heating the liquid in the temperature control module provided in the circulation flow path of each of the plurality of liquid ejecting units, and adjusting a viscosity of the liquid in the liquid ejecting unit of each of the plurality of liquid ejecting sections to a predetermined viscosity by adjusting a flow rate of the liquid in the circulation flow path of each of the plurality of liquid ejecting units.

* * * * *